US009922504B2

(12) United States Patent
Nakamura

(10) Patent No.: US 9,922,504 B2
(45) Date of Patent: Mar. 20, 2018

(54) GAMING MACHINE, METHOD AND PROGRAM FOR PROVIDING A GAME

(71) Applicant: Konami Gaming, Inc., Las Vegas, NV (US)

(72) Inventor: Daisuke Nakamura, Zama (JP)

(73) Assignee: KONAMI GAMING, INC., Las Vegas, NV (US)

( * ) Notice: Subject to any disclaimer, the term of this patent is extended or adjusted under 35 U.S.C. 154(b) by 53 days.

(21) Appl. No.: 14/851,777

(22) Filed: Sep. 11, 2015

(65) Prior Publication Data

US 2016/0086428 A1 Mar. 24, 2016

(30) Foreign Application Priority Data

Sep. 24, 2014 (JP) ................................ 2014-193807

(51) Int. Cl.
*A63F 13/00* (2014.01)
*G07F 17/34* (2006.01)
*G07F 17/32* (2006.01)

(52) U.S. Cl.
CPC .......... *G07F 17/34* (2013.01); *G07F 17/3244* (2013.01)

(58) Field of Classification Search
CPC .. G07F 17/3244; G07F 17/34; G07F 17/3262; G07F 17/3267
USPC ........................................................... 463/21
See application file for complete search history.

(56) References Cited

U.S. PATENT DOCUMENTS 7,887,407 B1 2/2011 Singer et al.
2004/0033829 A1 2/2004 Pacey et al.
2008/0113743 A1 5/2008 Dunaevsky et al.
2009/0124325 A1 * 5/2009 Wadleigh ................ G07F 17/34 463/20
2010/0120507 A1 * 5/2010 Rodgers .............. G07F 17/3262 463/20
2011/0021266 A1 * 1/2011 Jaffe ................... G07F 17/3258 463/25
2012/0034973 A1 * 2/2012 Frank .................. G07F 17/3244 463/25

OTHER PUBLICATIONS

Australian Patent Examination Report No. 1 for Patent Application No. 2015227386 dated Oct. 28, 2015.

* cited by examiner

*Primary Examiner* — Allen Chan
(74) *Attorney, Agent, or Firm* — Howard & Howard Attorneys PLLC

(57) ABSTRACT

To provide a gaming machine that can provide a new type of game that maintains or improves the interest of a player, and a method and program for providing a game. In the gaming machine 1, by removing symbols of a particular type and moving a following symbol, the ratio of symbols of types other than the particular type becomes higher in the symbol array formed on the display unit 27, and it is easier for the symbol array to configure a winning combination. Because the chance of winning is higher after the particular type of symbol is removed in this manner, it is possible to provide a new type of game where the interest of the player can be maintained or improved after the symbols are removed.

33 Claims, 24 Drawing Sheets

GAMING MACHINE, METHOD AND PROGRAM FOR PROVIDING A GAME

CROSS-REFERENCE TO RELATED APPLICATION

This application claims priority to Japanese Patent Application Serial No. 2014-193807, filed Sep. 24, 2014, the disclosure of which is hereby incorporated by reference in its entirety.

TECHNICAL FIELD

The present invention relates to a gaming machine and a method and program for providing a game.

BACKGROUND OF THE INVENTION

A gaming machine represented by a slot machine is highly popular among casino customers as a device that provides gambling that is easy to enjoy, and recent statistics also report that sales from gaming machines account for the majority of casino earnings. Initial slot machines were simple devices, wherein an inserted coin is received, a configured reel rotates and stops mechanically according to a handle operation, and win or lose is determined by a combination of symbols stopped on a single pay line. However, recent gaming machines, such as mechanical slot machines driven by a highly accurate physical reel via a computer controlled stepping motor, video slot machines that display a virtual reel on a display connected to a computer, and various gaming machines that apply similar technology to other casino games are quickly advancing. For the manufacturers that develop these gaming machines, an important theme is to provide an attractive game that strongly attracts casino customers as players, and improves the functionality of the gaming machine.

Under this type of background, in recent gaming machines, in order to make a change in game progress, after stopping a reel and forming a symbol array, which is the game result and outcome, a process is proposed that removes a portion of the symbols that configure the symbol array. For example, in Patent Document 1, an update process of the symbol array that forms a new symbol array is disclosed in addition to removing the symbols that configure a winning combination from the symbol array. According to this update process of a symbol array, the player can maintain hope for winning even after the reel has stopped, and the interest of the player in the game result can be maintained for a long period of time.

DOCUMENTS OF THE RELATED ART

Patent Document #1: U.S. Pat. No. 7,887,407

SUMMARY OF INVENTION

However, in game machines that use the update process of a symbol array described above, because the symbols that configure a winning combination from the symbol array are removed, the type of symbols that remain when a winning combination is not configured are only those that are uniformly dispersed, and only symbols with a low rank may remain, especially when symbols with a high rank configure a winning symbol. By these circumstances, the player cannot have a large hope for the new symbol array formed after the symbols are removed, and the interest of the player in the game result is reduced. Because of this, an updated process of a symbol array that can maintain or improve the interest of the player is hoped for even after the symbols are removed.

In light of the above circumstances, various aspects of the present invention aim to provide a gaming machine that can provide a new type of game that can maintain or improve a interest of the player, and a method and program for providing a game.

To solve the above problems, the gaming machine according to one aspect of the present invention is provided with an operation unit that receives an operation from a player, a display unit that partially displays a plurality of reels each having a series of symbols, and a control unit, connected to the operation unit and the display unit, that rotates and stop the plurality of reels based on a player operating the operation unit and that grants an award for a symbol array formed on the display unit by the stopped plurality of reels, wherein the control unit, after displaying a plurality of symbols on the display unit by stopping the reel, removes all symbols of a particular type from the display unit, fills in the position of the removed symbol by moving a following symbol in the rotational direction of the reel after the removed symbol, and grants an award based on a symbol array that is formed on the display unit after the following symbol is moved.

Furthermore, the control method for a game according to one aspect of the present invention is a method for providing a gaming machine provided with an operation unit that receives an operation from a player, a display unit that partially displays a plurality of reels each having a series of symbols, and a control unit, connected to the operation unit and the display unit, that rotates and stop the plurality of reels based on a player operating the operation unit and that grants an award for a symbol array formed on the display unit by the stopped plurality of reels, wherein the control unit executes a step that rotates the plurality of reels based on a player operating the operation unit, a step that stops the rotation of the plurality of reels and displays a plurality of symbols on the display unit, a step for removing all symbols of a particular type from the display unit, a step for filling in the position of the removed symbol by moving a following symbol in the rotational direction of the reel after the removed symbol, and a step that grants an award based on a symbol array that is formed on the display unit after the following symbol is moved.

Furthermore, the program according to one aspect of the present invention is a program executed by an operation unit that receives an operation from a player, a display unit that partially displays a plurality of reels each having a series of symbols, and a computer, connected to the operation unit and the display unit, that rotates and stops the plurality of reels based on a player operating the operation unit and that grants an award for a symbol array formed on the display unit by the stopped plurality of reels, wherein a function that rotates the plurality of reels based on the player operating the operation unit, a function that stops the rotation of the plurality of reels and displays a plurality of symbols on a display unit, a function that removes all symbols of a particular type from the display unit, a function that fills in the position of the removed symbol by moving a following symbol in the rotational direction of the reel after the removed symbol, and a function that grants an award based on a symbol array that is formed on the display unit after the following symbol is moved are realized in the computer.

In one aspect of the present invention, a gaming machine includes an operation unit, a display unit, and a control unit. The operation unit accepts operation by a player. The display unit is coupled to the operation unit and is configured to display a grid having a plurality of display elements in a predetermined arrangement forming a plurality of rows and columns. Each column of the grid forms a respective reel. Each reel has an associated virtual reel strip. Each virtual reel strip has symbols disposed thereon. The control unit is coupled to the operation unit and the display unit and is configured to rotate and randomly stop the plurality of virtual reel strips to display a plurality of symbols within the grid. The displayed symbols form a first outcome. The control unit is further configured to perform a set of secondary steps, the secondary steps including:

removing all symbols of a particular type from the first outcome; and, filling the display element of any removed symbol from the first outcome by moving a following symbol from the respective virtual reel strip in a rotational direction of the respective reel into the respective display element, forming a second outcome.

According to one aspect of the present invention, a gaming machine that can provide a new type of game that maintains or improves an interest of the player, and a method and program for providing a game is provided.

DETAILED DESCRIPTION OF THE INVENTION

Below, the gaming machine of the first embodiment of the present invention will be described with reference to the attached drawings. Note that the same portions or corresponding portions are given the same numerals in each drawing, and overlapping descriptions are omitted.

Figure 1:
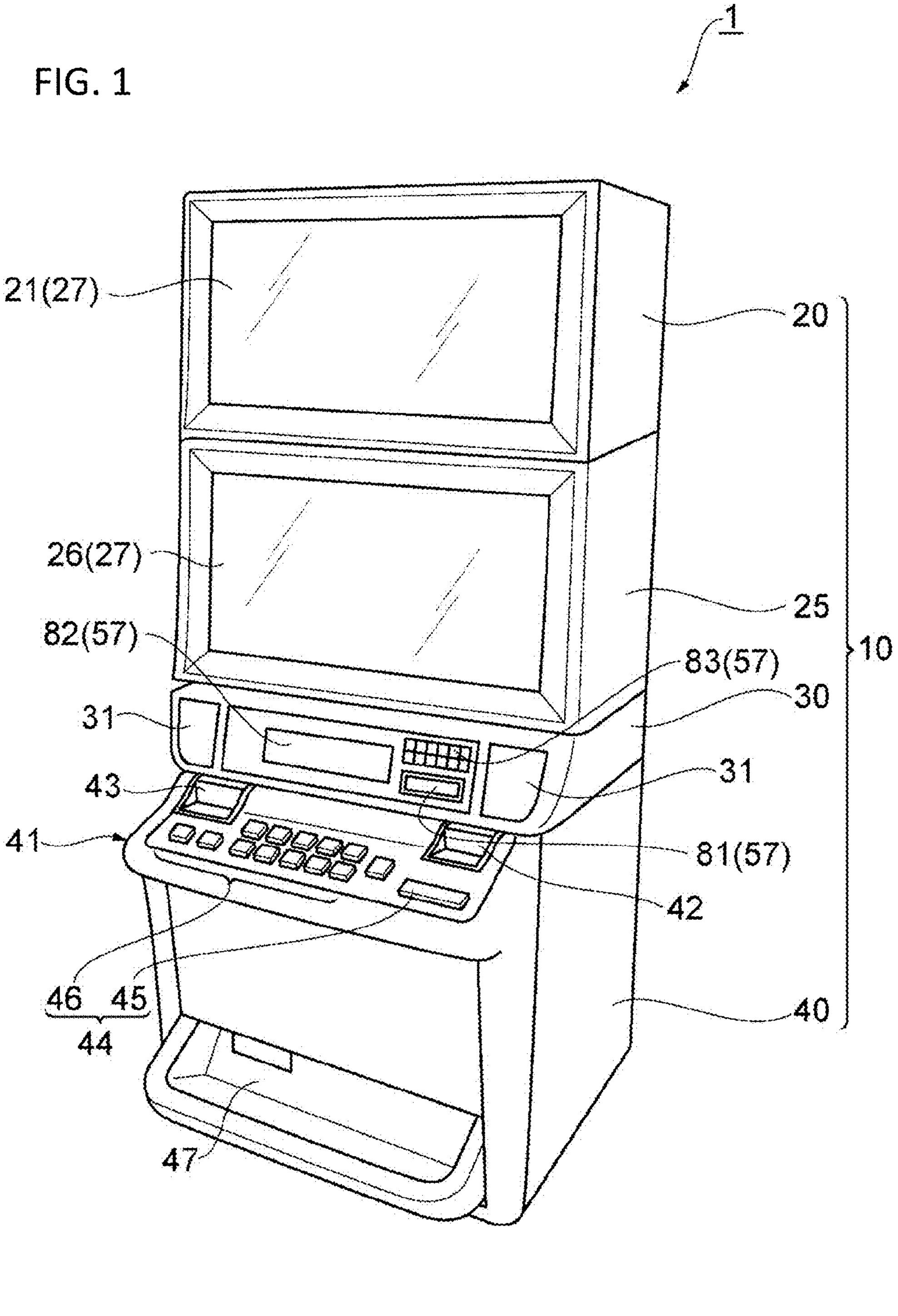
FIG. 1 is a perspective view of the gaming machine according to the first embodiment.

The gaming machine according to the first embodiment receives a predetermined game value from the player, generates a game result, and provides a payout to the player according to the game result. FIG. 1 is a perspective view of a gaming machine 1 according to the first embodiment of the present invention. As illustrated in FIG. 1, this gaming machine 1 provides a housing 10 configured from a first cabinet 20 providing an upper display 21, a second cabinet 25 providing a lower display 26, a third cabinet 30 that houses a player tracking unit 57, and a fourth cabinet 40 that provides a control panel 41 and also houses a control unit 50 that controls each part. Each configuration is described below.

The first cabinet 20 is provided on the upper part of the housing 10, and the second cabinet 25 is provided below the first cabinet 20. The upper display 21 provided on the first cabinet 20 and the lower display 26 provided on the second cabinet 25 are flat panel display devices such as both liquid crystal display devices and organic EL display devices and the like, and by controlling via each control unit 50 the game screen mentioned below functions as a display unit 27 provided to the player.

The third cabinet 30 is provided below the second cabinet 25. Speakers 31 are provided on the left and right of the front surface of the third cabinet 30, and by controlling via the control unit 50, sound is provided to the player. Further, the player tracking unit 57 is housed on the center of the front surface of the third cabinet 30. The player tracking unit 57 has a card reader 81 that recognizes a player identification card, a display 82 that presents data to the player, and a keypad 83 that receives input by the player. This type of player tracking unit 57 reads information recorded on the player identification card inserted by the player into the card reader 81, and displays the information and/or information acquired by communicating with the external system on the display 82, by cooperatively operating with the control unit 50 mentioned below or an external system. Further, input from the player is received by the keypad 83, the display of the display 82 is changed according to the input, and communication with the external system is carried out as necessary.

The fourth cabinet 40 is provided below the third cabinet 30. On the fourth cabinet 40, one part is made to project from a front side, and the control panel 41 is provided. On the control panel 41, a bill/ticket identification unit 42, the printer unit 43, and an operation unit or part 44 are provided.

The bill/ticket identification unit 42 is disposed on the control panel 41 in a state where the insertion opening that a bill or ticket is inserted into is exposed, an identification part that identifies a bill/ticket by various sensors on the inside of the insertion opening is provided, and a bill/ticket storage part is provided on the outgoing side of the identification part on the inside of the fourth cabinet 40. The bill/ticket identification unit 42 receives and identifies bills and tickets (including vouchers and coupons) that are the game value as a game executing value, and notifies the control unit 50 mentioned below.

The printer unit 43 is disposed on the control panel 41 in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer unit 43, under the control of the control unit 50 mentioned below, prints information on paper and outputs a ticket according to credit payout processing from the gaming machine 1. The output ticket can use the payout credit for game play by being inserted into the bill/ticket identification unit of another gaming machine, or it can be exchanged for cash by a kiosk terminal inside of the casino or a casino cage.

The operation unit 44 is a group of buttons that receives various instructions from the player on the gaming machine 1. The operation unit 44, for example, has a spin button 45 and set group of buttons 46. The spin button 45 receives an instruction to start (start rotating the reel) the game listed below. The group of setting buttons 46 includes a group of bet buttons, a group of line-designated buttons, a max bet button, a payout button, and the like. The group of bet buttons receives from the player an instruction operation regarding the bet amount of credits (bet number). The group of line-designated buttons receives from the player an instruction operation that designates a line (referred to as an effective line below) subjected to a line judgment below. The max bet button receives from the player an instruction operation for a bet of the maximum amount of credits that can be bet at one time. The payout button receives from the player an instruction operation instructing a credit payout accumulated in the gaming machine 1.

Further, on the inside of the fourth cabinet 40, a control board equipped with a central processing unit 51 (abbreviated as CPU below) that configures the control unit 50, an interface part 52, a memory 53 and a storage 54 and the like is incorporated. The control board, configured so that communication is possible through the interface part 52 and each of the components equipped on the first cabinet 20, the second cabinet 25, the third cabinet 30, and the fourth cabinet 40, controls the operation of each part by executing the program recorded in the memory 53 or the storage 54 of the CPU 51, and provides a game to the player.

Figure 2:
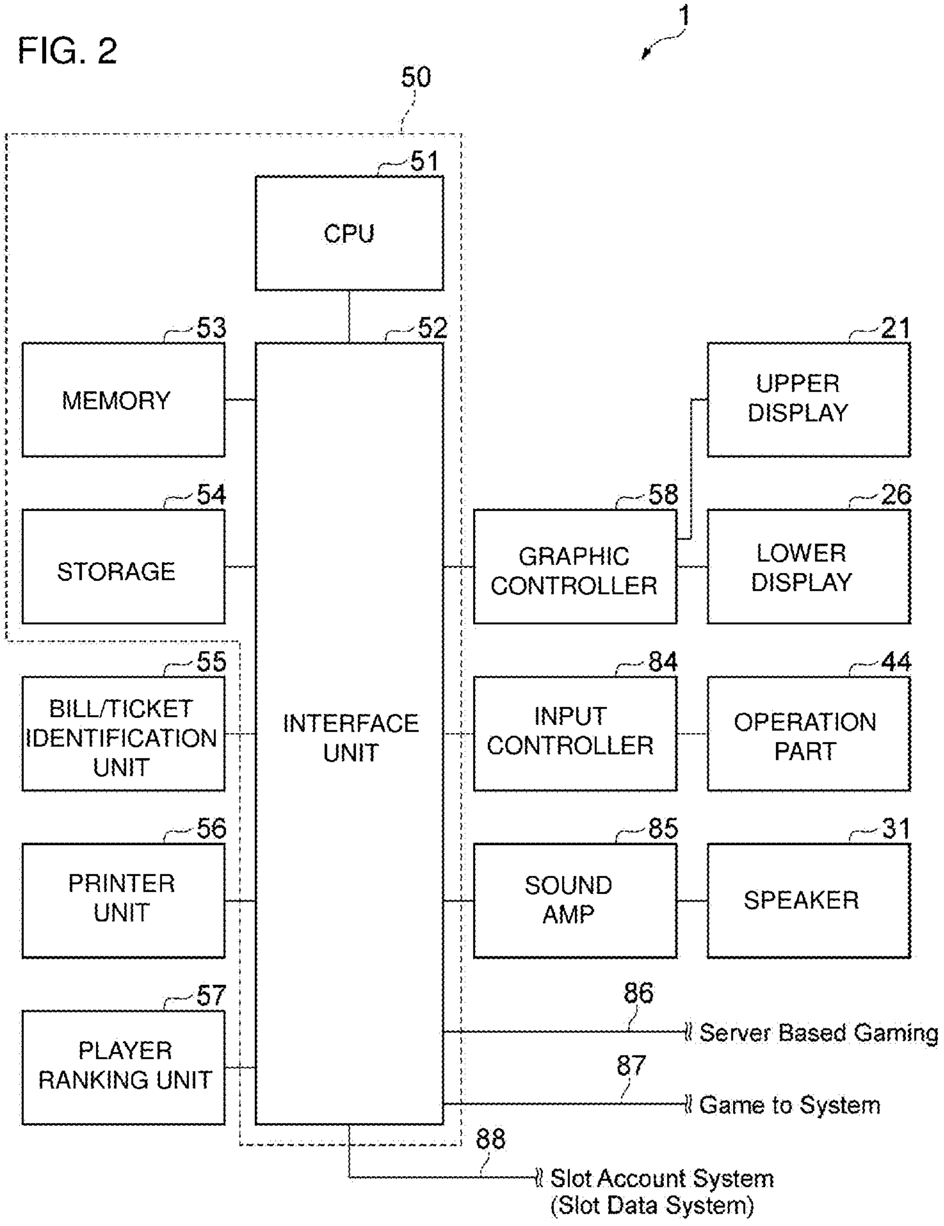
FIG. 2 is a block diagram of the gaming machine in FIG. 1.

FIG. 2 shows a functional block diagram of the gaming machine 1 according to the present embodiment. The gaming machine 1 provides the control unit 50. The control unit 50 is configured as a computer unit provided with the CPU 51, the interface part 52 including a chip set providing communication functions such as a memory bus connected to a CPU, various expanding buses, serial interface, USB interfaces, Ethernet (registered trademark) and the like, and the memory 53 and the storage 54 that can address the CPU 51 via the interface part 52. The memory 53 can be configured to include RAM that is a volatile storage medium, ROM that is a nonvolatile storage medium, and EEPROM that is a rewritable nonvolatile storage medium. The storage 54 provides functions as an external storage device to the control unit 50, can use reading devices such as a memory card, a magneto optical disk, and the like that are removable storage mediums, and can also use hard disks.

In addition to the CPU 51, the memory 53, and the storage 54, a bill/ticket identification unit 55, a printer unit 56, the player tracking unit 57, a graphic controller 58, an input controller 84, and a sound amp 85 are connected on the interface part 52. Note that, when illumination that provides decorative lighting to the gaming machine 1 is provided, the illumination is controlled under the control of the control unit 50 on the interface part 52, and an illumination controller that provides a decorative lighting effect may be connected.

The control unit 50 that has such memory 53 and storage 54 controls each part by executing a program stored in the memory 53 and the storage 54, and provides a game to the player. Here, for example, there may be a configuration that stores a program and data of an operating system and subsystem that provides the basic functions of the control unit 50 to the EEPROM of the memory 53, and stores a program and data of an application that provides a game to the storage 54. According to such a configuration, it can be easy to change or update a game by replacing the storage 54. Note that the control unit 50 may be a multiprocessor configuration that has a plurality of CPUs.

Each block connected to the control unit 50 is described below.

The bill/ticket identification unit 55 corresponds to the bill/ticket identification unit 42, receives bills or tickets in the insertion opening, and notifies the control unit 50 identifying information corresponding to the payout processing of an assortment of bills or credits. The bill/ticket identification unit 55 notifies the information to the control unit 50, and the control unit 50 increases the usable credit amount inside of the game according to the notified content. The printer unit 56 corresponds to the printer unit 43, and under the control of the control unit 50 that receives an operation of the payout button of the group of setting buttons 46, information corresponding to the credit payout processing from the gaming machine 1 is printed and output on a printed ticket.

The player tracking unit 57 cooperatively operates with the control unit 50, and sends and receives information and the like of the player between the casino management system. The graphic controller 58 controls the upper display 21 and the lower display 26, under the control of the control unit 50, and displays a display image that includes various graphic data. The sound amp 85 drives the speakers 31 under the control of the control unit 50, and provides various sounds such as an announcement, sound effects, BGM, and the like.

Further, the interface part 52 has various communication interfaces for communicating with the exterior of the gaming machine 1, and can, for example, communicate with an external network by Ethernets 86, 87, and a serial output 88. In the present embodiment, one example shows when there is communication between a well-known server side gaming network (Server Based Gaming of FIG. 2), a G2S network (Game to System of FIG. 2), and a slot information system (Slot Data System of FIG. 2), respectively.

Referring to FIG. 1, in one embodiment, referring to FIG. 1, the control panel 41 includes a plurality of user input devices that may include an acceptor device which accepts media associated with a monetary value to establish a credit balance, a validator configured to identify the physical media, a cash-out button actuatable to cause an initiation of a payout associated with the credit balance. The acceptor device may include a touchscreen display associated with the display unit 27 and/or the player tracking unit 57, the paper money/ticket identification unit 42, the operation unit 44, the player tracking unit 57, a coin slot, a ticket in ticket out (TITO) system, a bill acceptor, and/or any suitable device that enables the gaming machine 1 to receive media associated with a monetary value and establish a credit balance for use in playing the gaming machine. In one embodiment, the acceptor device may be configured to receive physical media such as, for example, a coin, a medal, a ticket, a card, a boll, currency, and/or any suitable physical media that enables the gaming machine 1 to function as described herein. The acceptor device may also be configured to accept virtual media such as, for example, a player tracking account, a virtual credit balance, reward points, gaming credits, bonus points, and/or any suitable virtual media that enables the gaming machine 1 to function as described herein. For example, in one embodiment, the coin slot may include an opening that is configured to receive coins and/or tokens deposited by the player into the gaming machine 1. The control unit 50 converts a value of the coins and/or tokens to a corresponding amount of gaming credits that are used by the player to wager on games played on the gaming machine 1. The bill acceptor may include an input and output device that is configured to accept a bill, a ticket, and/or a cash card into the bill acceptor to enable an amount of gaming credits associated with a monetary value of the bills, ticket, and/or cash card to be credited to the gaming machine 1. In one embodiment, the bill acceptor also includes a printer (not shown) that is configured to dispense a printed voucher ticket that includes information indicative of an amount of credits and/or money paid out to the player by the gaming machine 1 during a gaming session. The voucher ticket may be used at other gaming devices, or redeemed for cash, and/or other items as part of a casino cashless system.

With specific reference to FIGS. 1 and 2, the gaming machine 1 includes an operation unit or unit 44, a display unit 27, and a control unit 50. The operation unit 44 accepts operation by a player. The display unit 27 is coupled to the operation unit 44 and is configured to display a grid 59 (see FIG. 3) having a plurality of display elements 64 in a predetermined arrangement forming a plurality of rows and columns Each column of the grid 59 forms a respective reel. Each reel has an associated virtual reel strip (see below). Each virtual reel strip has symbols disposed thereon. The control unit 50 is coupled to the operation unit 44 and the display unit 27 and is configured to rotate and randomly stop the plurality of virtual reel strips to display a plurality of symbols within the grid 59. The displayed symbols form a first outcome. The control unit is further configured to perform a set of secondary steps. The secondary steps including:

removing all symbols of a particular type from the first outcome; and, filling the display element of any removed symbol from the first outcome by moving a following symbol from the respective virtual reel strip in a rotational direction of the respective reel into the respective display element, forming a second outcome.

In one embodiment, different symbols may be defined as particular type of symbols. For example the symbols on the virtual reel strips are from a set of symbols. The symbols in the set of symbols may have a predetermined rank from lower to highest. In one embodiment, the particular type of symbol is any symbol having a ranking equal or equal or less than a predetermined ranking. The predetermined ranking may be fixed and dynamically determined.

In one embodiment, the particular type of symbol is determined as a function of the game value input by the player (see below).

Additionally, the particular type of symbol may be modified to increase or decrease a number of symbols within the particular type of symbol. In one embodiment, the modification of the particular type of symbol may expire after a predetermined number of spins, i.e., games played (including 1).

As described more fully below, the gaming machine may provide a main game and a feature game. The secondary steps may be performed in the feature game. For example, the feature game may include a predetermined number of free spins. Any removed symbol(s) remain removed from the respective virtual reel for any remaining free spins.

Figure 3:
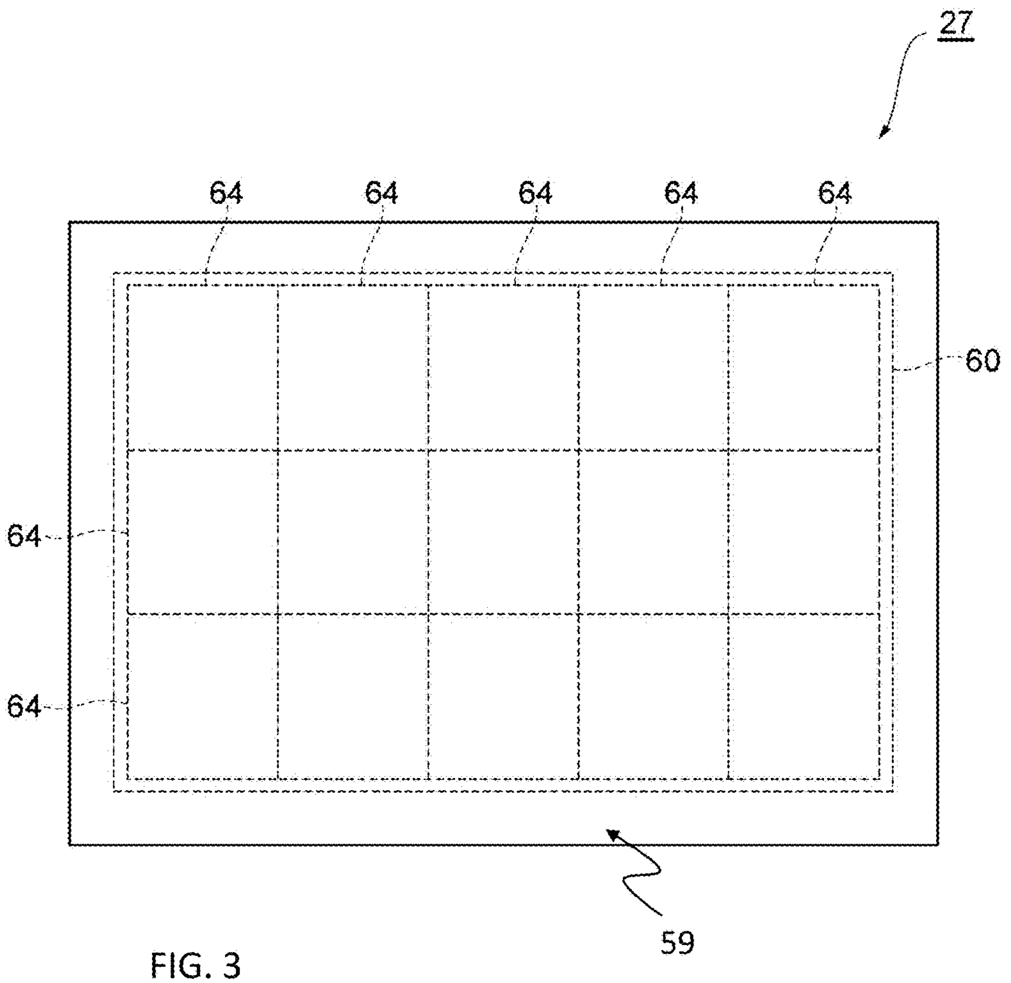
FIG. 3 is a schematic diagram illustrating one example of a symbol display region of the gaming machine in FIG. 1.

FIG. 3 is a figure schematically illustrating a game screen provided by the gaming machine 1 according to the present embodiment. Such a game screen displays on the display unit 27 (the upper display 21 and/or the lower display 26) by the control unit 50 executing a predetermined program. The present embodiment shows the state of displaying the game screen on the lower display 26. As illustrated in FIG. 3, this game screen has a symbol display region 60 for displaying symbols. The gaming machine 1 of the present embodiment displays a symbol array, which is the game result, on the symbol display region 60 by redisplaying symbols displayed in the symbol display region 60 as compensation for a predetermined game value, and operates as a slot machine that awards an award according to the symbol array.

Note that, while omitted in FIG. 3, a credit amount, number of bets, a region for displaying a credit amount achieved by winning (number of WINs), and the like, and a decoration region may also be provided in the display unit 27 other than the symbol display region 60.

The symbol display region 60 is configured by a plurality of cells 64, which is the stopping position of a symbol. Specifically, the symbol display region 60 is configured by 15 cells arranged in a grid pattern of 3 rows and 5 columns Note that below, the horizontal direction and the vertical direction of the display unit 27 are referred to as the row direction and the column direction respectively.

A boundary line of the cells 64 may be displayed on the display unit 27 in a state that is visually comprehensible to a player, or the display may be omitted. That is, the cells 64 are sufficient if logically or ideally defined within the gaming machine 1 as a symbol stopping position, and a visible boundary thereof is not necessarily required.

Figure 4:
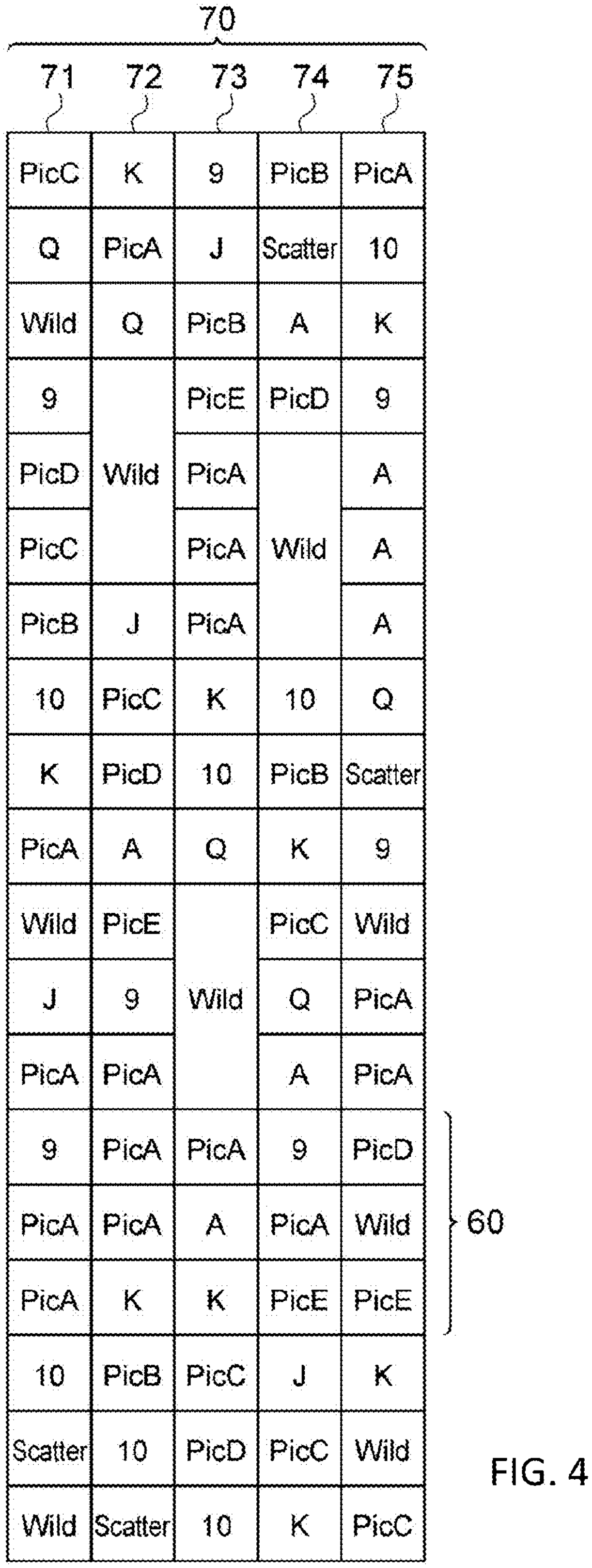
FIG. 4 is a diagram illustrating one example of a virtual reel set displayed in the symbol display region in FIG. 3.

A predetermined symbol based on the symbol sequence in the virtual reel strips 71 to 75, which forms a virtual reel set 70 as illustrated in FIG. 4, is displayed in each cell 64 in the symbol display region 60. That is, the virtual reel strips 71 to 75 are associated by column to the cells 64 in the symbol display region 60, and a predetermined, partially disposed symbol in each virtual reel strip 71 to 75 is displayed. Further, symbols displayed on the cells 64 in the symbol display region 60 are varied by moving (scrolling) symbols in each column based on a symbol sequence in the virtual reel strips 71 to 75, and the symbols are stopped by stopping the movement (scrolling) of each column Here, the virtual reel strips 71 to 75 are data used in a program had by the control unit 50 in the memory 53 or the storage 54, and is the data that shows the symbol sequence (that is the alignment sequence of symbols in each reel) predetermined for each column of cells. Further, the virtual reel set 70 is a generic name for this type of virtual reel strip 71 to 75. Each virtual reel strip 71 to 75 is configured of the 19 symbols in the example in FIG. 4 and aligned in an order defined for each reel by these symbols. In the present embodiment, three symbols in the virtual reel strip 71 to 75 are each displayed in the symbol display region 60.

Figure 5A:
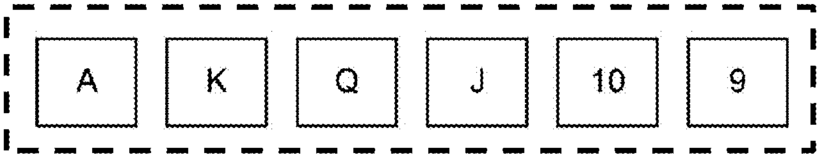
FIGS. 5A and 5B are diagrams illustrating types of symbols displayed in the symbol display region.
Figure 5B:
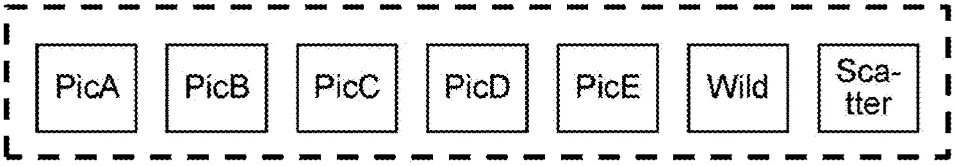

Types of symbols that configure the virtual reel strips 71 to 75 illustrated in FIG. 4 are illustrated in FIGS. 5 (*a*) and 5 (*b*). Each symbol that configures the virtual reel strips 71 to 75 are either 6 types of card symbols illustrated in FIG. 5 (*a*), or 7 types of high ranking symbols illustrated in FIG. 5 (*b*).

The 6 types of card symbols illustrated in FIG. 5 (*a*) are represented in the pattern of "A", "K", "Q", "J", "10", and "9" used with playing cards. The card symbol is a symbol with the lowest rank among the symbols that configure the virtual reel strips 71 to 75.

The 7 types of high-rank symbols in FIG. 5 (*b*) are made up of 5 types of picture symbols, a wild symbol, and a scatter symbol. The 5 types of picture symbols are symbols that show various pictures such as treasure chests and diamonds, and are symbols with a higher rank than the card symbols. In FIG. 4 or FIG. 5 (*b*), the picture symbols are illustrated as "PicA", "PicB", "PicC", "PicD", and "PicE", for simplicity.

The wild symbol is a symbol that passes as another symbol (that is, a symbol substituted as another symbol) upon a winning determination in a normal game described below, and can configure a winning combination with an unspecified symbol. The wild symbol is one of the symbols with the highest rank among the symbols that configure the virtual reel strips 71 to 75. The wild symbol is illustrated by "Wild" in FIG. 4 and FIG. 5 (*b*). The virtual reel strips 72, 73, and 74 of the present embodiment include a stack symbol of wilds (a continuous group of symbols composed of three continuous "Wilds"), and the stack symbol of wilds is illustrated in FIG. 4 by the vertical "Wild" compared to the other symbols.

The scatter symbol is a symbol used upon the winning determination of a special game described below, and is provided in a special game according to the number of scatter symbols in the symbol display region 60. The wild symbol is one of the symbols with the highest rank among the symbols that configure the virtual reel strips 71 to 75. The scatter symbol is illustrated by "Scatter" in FIG. 4 and FIG. 5 (*b*).

Symbols with a high rank make it easier to achieve a high profit when winning, or make it easier to configure a winning combination, compared to symbols with a low rank. Further, symbols with a high rank make it easier to win at a special game. Because of this, the higher the rank of the symbol displayed in the symbol display region, the more advantageous the game is to the user. In other words, because the high ranking symbol described above has a higher rank than the card symbol, it is more advantageous in regards to a winning payout that is one type of benefit compared to a card symbol. Moreover, even within high ranking symbols, because the wild symbol and the scatter symbol are used as winning conditions of a special game, they are advantageous in regards to winning the special game that is one type of benefit.

Figure 6:
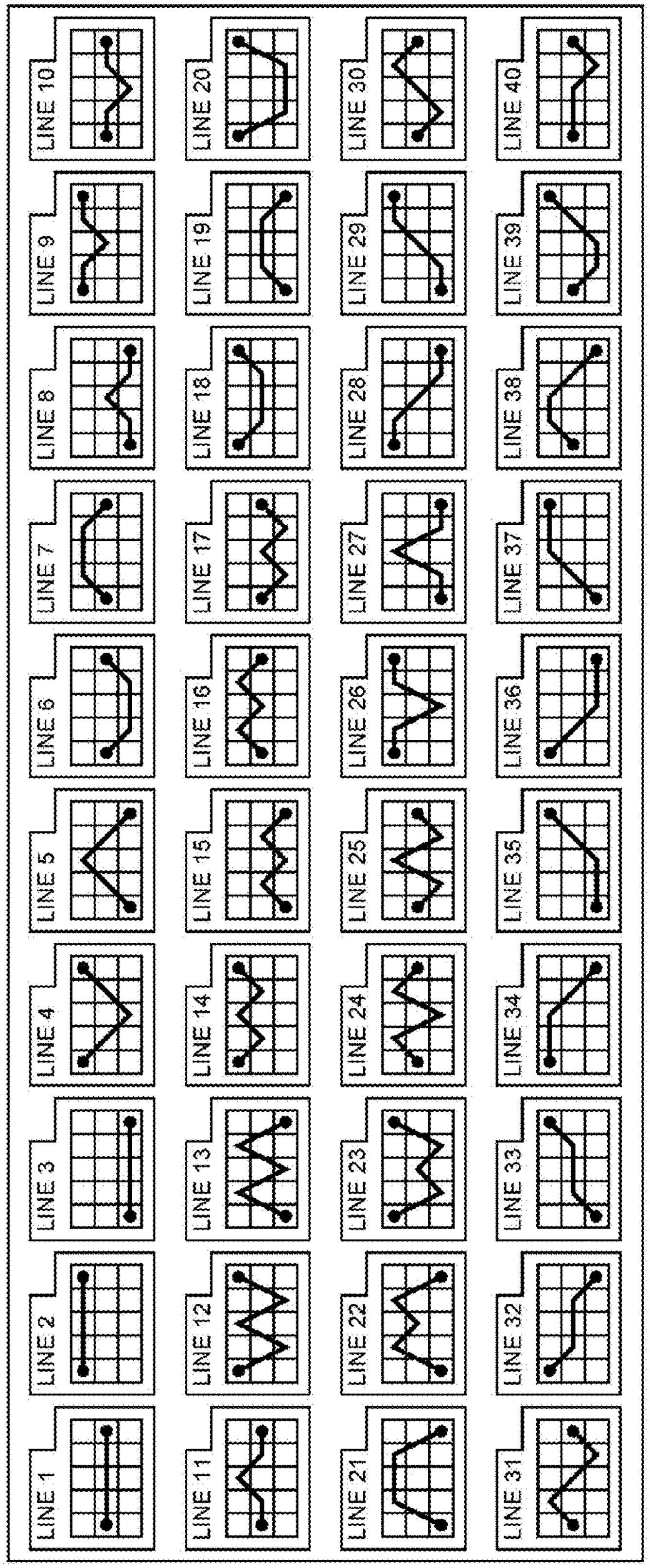
FIG. 6 is a diagram illustrating one example of headlines set in the symbol display region.

A pay line used upon a winning determination is set in the symbol display region 60. The pay line is set so as to span from a cell in the column on the left edge to a cell in the column on the right edge, and is a line composed of the combination of a plurality of cells 64 that form the objective of a winning determination. The number of an effective line in a set pay line is selected by a player via operation of a group of line indication buttons included in the group of set buttons 46 in the operation unit 44. For a symbol array, which is a game result, the control unit 50 determines a win, for example, when a same symbol exceeds a predetermined number and is aligned on a set pay line, and pays a player a payout according to the type of symbol and the number. In the gaming machine 1 of the present embodiment, a predetermined number of pay lines (LINE 1 to 40) are set for a three row five column cell in the symbol display region 60 (see FIG. 6). The method for a winning determination may determine a win when a predetermined number of a same symbol are aligned on a predetermined pay line from a cell in the column on the left edge, may determine a win when a predetermined number of a same symbol are aligned on a predetermined pay line from a cell in the column on the right edge, or may determine a win when a predetermined number of a same symbol are aligned in any adjacent columns on a predetermined pay line.

The gaming machine 1, according to one embodiment, described below. In the illustrated embodiment, the gaming machine provides three types of games including a normal game, which is provided when a predetermined condition is not met (also referred to as a main game or a prime game), and a first special game and a second special game which are provided when a predetermined condition is met. The first special game is a feature game, and a feature function described below is applied that is advantageous to the player when a predetermined trigger condition is met. The second special game is a free game, and provides a predetermined number of free games that do not consume game value when a predetermined trigger condition is met.

In the normal game, the first special game and the second special game described above, a symbol displayed in the symbol display region 60 forms a symbol array which is a game result, becomes the objective of a winning determination. In other words, the control unit 50 which started a game, randomly determines a stopping position for each of the virtual reel strips 71 to 75 illustrated in FIG. 4, the virtual reel strips 71 to 75 move from their current positions, and the operation of stopping at a stopping position is expressed using the display unit 27 (for example, the bottom display 26). By this, in the symbol display region 60, a symbol arrayed on the virtual reel strips 71 to 75 continuously moves (scrolls) in the vertical direction, and is stopped so as to display one symbol in one cell 64 while maintaining continuity.

However, in the present embodiment, a feature function that will be described below is applied during a feature game, and as a result, the symbol array temporarily displayed on the symbol display region 60 is updated to a different symbol array.

Below, the update process of the symbol array applied during a feature game will be described with reference to FIGS. 7 to 17.

Figure 7:
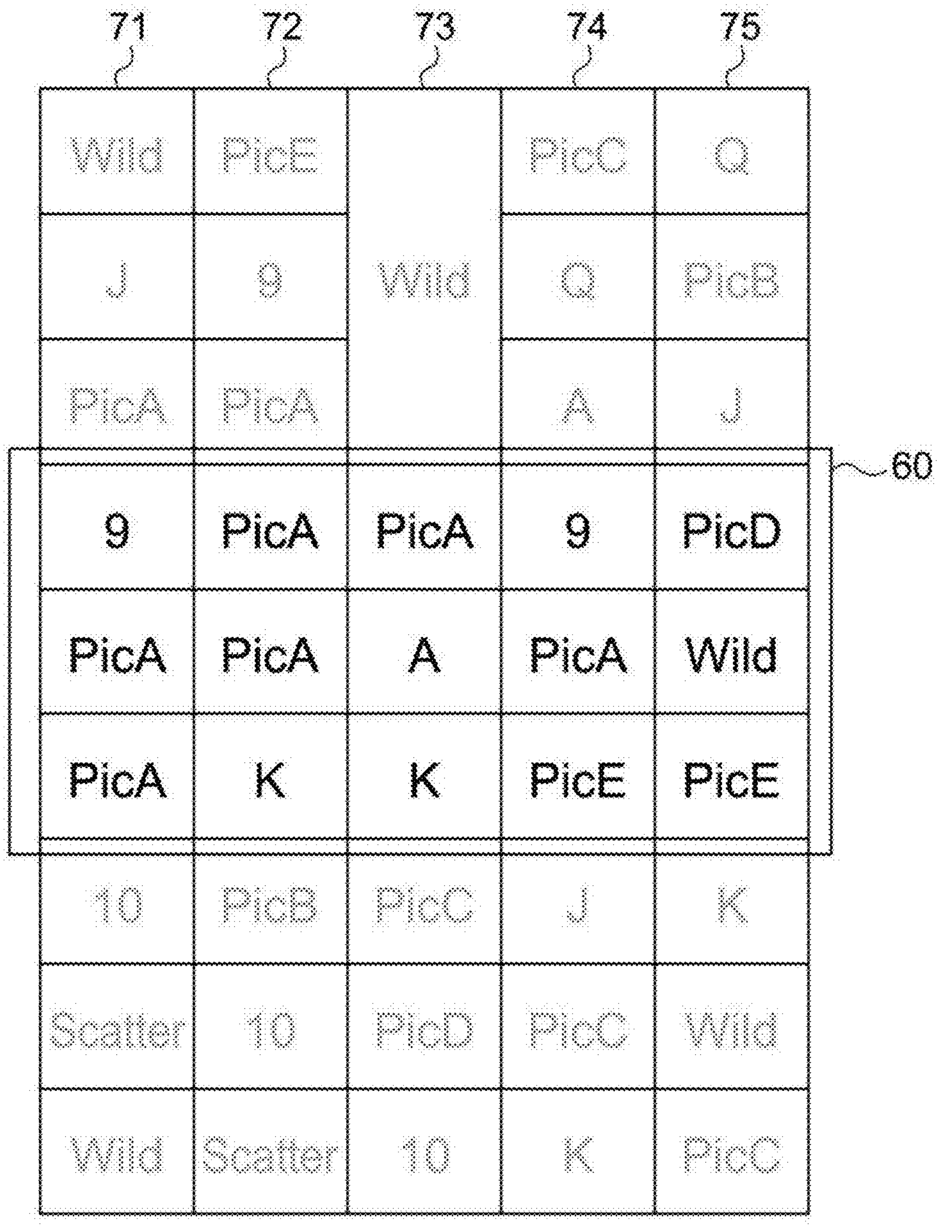
FIG. 7 is a diagram illustrating the state of the symbol array before the update process of the symbol array.

An example will be described where the control unit 50 displays the symbol array illustrated in FIG. 7 on the symbol display region 60 of the display unit 27 after the virtual reel strips 71 to 75 rotate and stop.

At this time, the control unit 50 removes all card symbols as particular types of card symbols from among the symbols displayed on the symbol display region 60 of the display unit 27. Specifically, the upper card symbol "9" of the virtual reel strip 71, the lower card symbol "K" of the virtual reel strip 72, the middle and lower card symbols "A" and "K" of the virtual reel strip 73, and the upper card symbol "9" of the virtual reel strip 74 are removed. The control unit 50 adds a target mark to the symbol to be removed before removing the symbol, and may notify the player that the symbol has been removed. Moreover, the control unit 50 may express simply to the player that the removed symbol has been disabled by displaying an animation such as the symbol with the target mark added being destroyed by a gunshot. When the control unit 50 has removed the card symbol, the cell that had displayed the card symbol becomes a blank cell with no symbol displayed.

Figure 9:
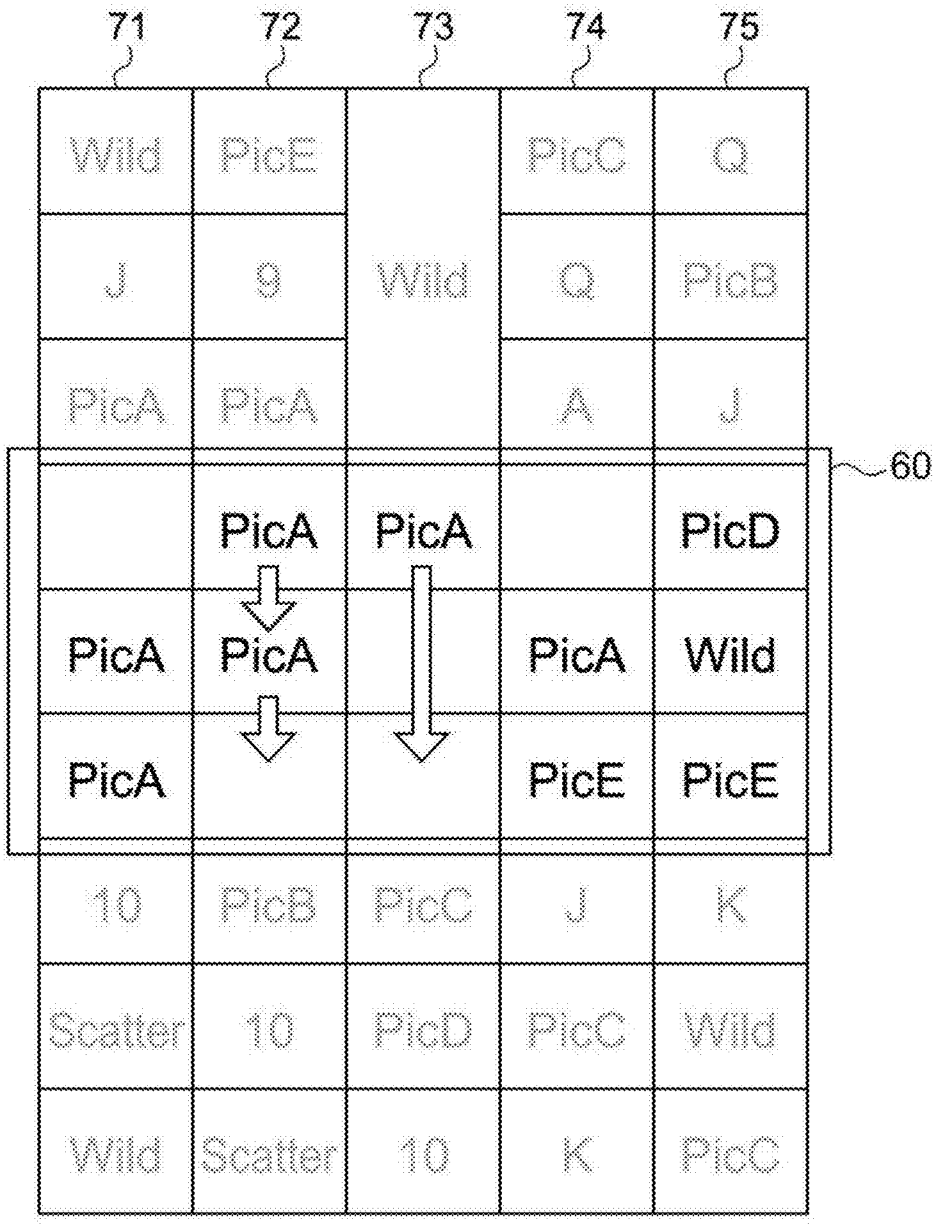
FIG. 9 is a diagram illustrating one state of the symbol array during the update process of the symbol array.
Figure 10:
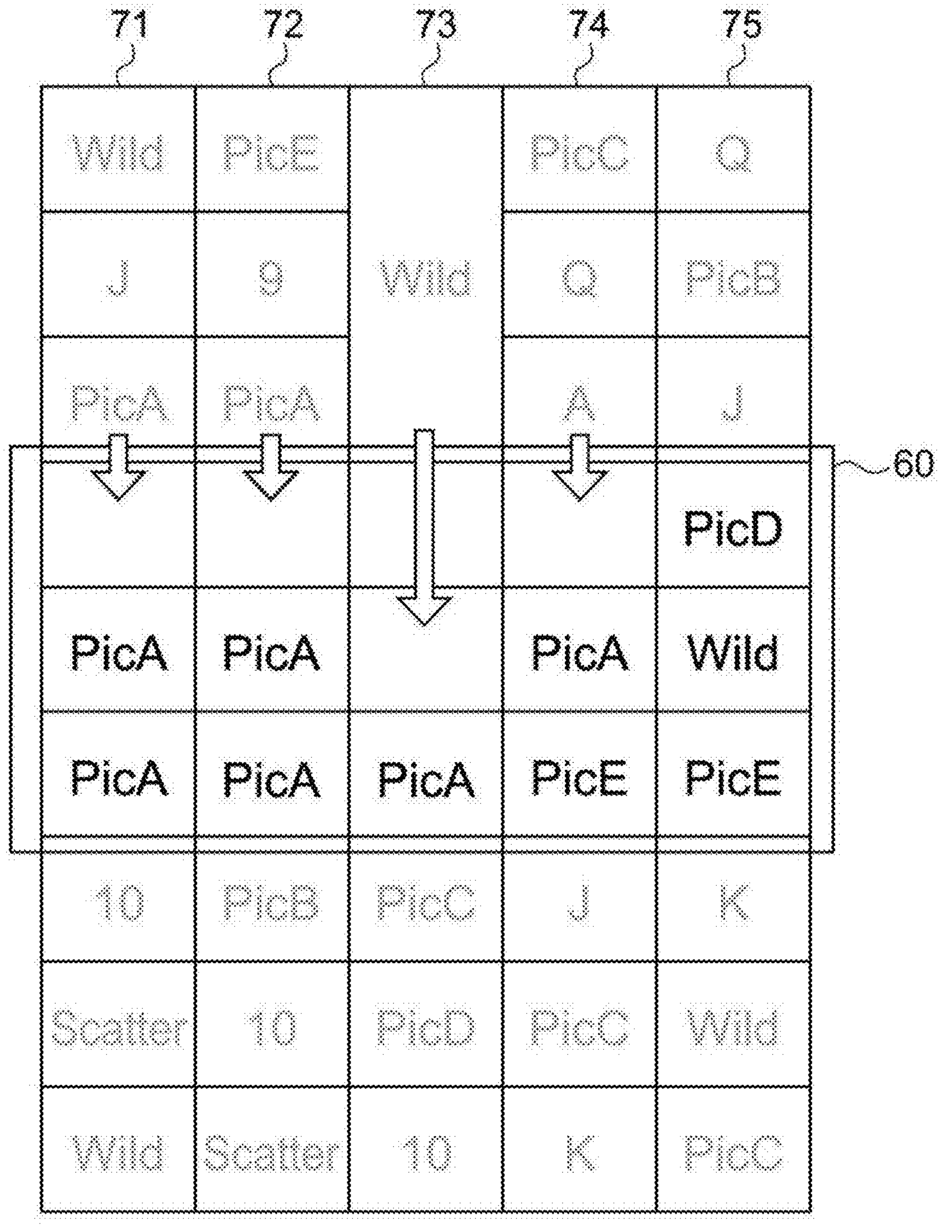
FIG. 10 is a diagram illustrating one state of the symbol array during the update process of the symbol array.

Then, the control unit 50 fills in the blank cell with a following symbol that continues after the removed card symbol. More specifically, the following symbol is a symbol that continues being displayed on the symbol display region 60 after the removed card symbol when the virtual reel strip is rotating, and is the symbol positioned on the upper side of the removed card symbol in FIGS. 4 and 8. The control unit 50 fills in the blank cell by moving the following symbol downward, as illustrated in FIGS. 9 and 10. FIG. 9 illustrates the state of the following symbol displayed on the symbol display region 60 moving downward. FIG. 10 illustrates the state of a following symbol outside of a region not displayed on the symbol display region 60 moving inside the region. By moving the following symbol, the control unit 50 fills in all the blank cells as illustrated in FIG. 11, and displays a symbol in all cells of the symbol display region 60 of the display unit 27.

In the present embodiment, the control unit 50 repeats the update process of the symbol array described above (in other words, the removal of the card symbol and moving of the following symbol) until card symbols do not exist on the symbol display region 60 of the display unit 27.

Figure 11:
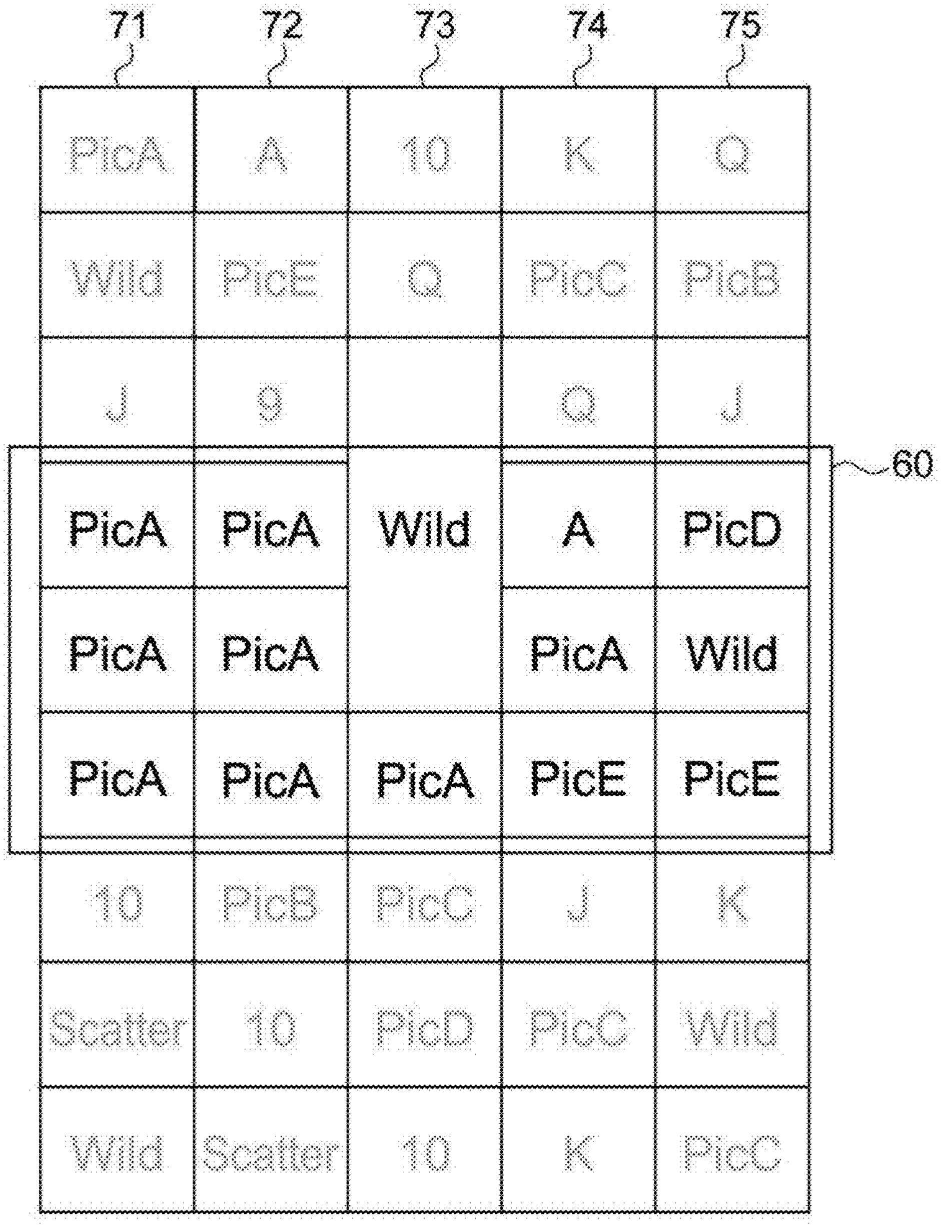
FIG. 11 is a diagram illustrating one state of the symbol array during the update process of the symbol array.
Figure 12:
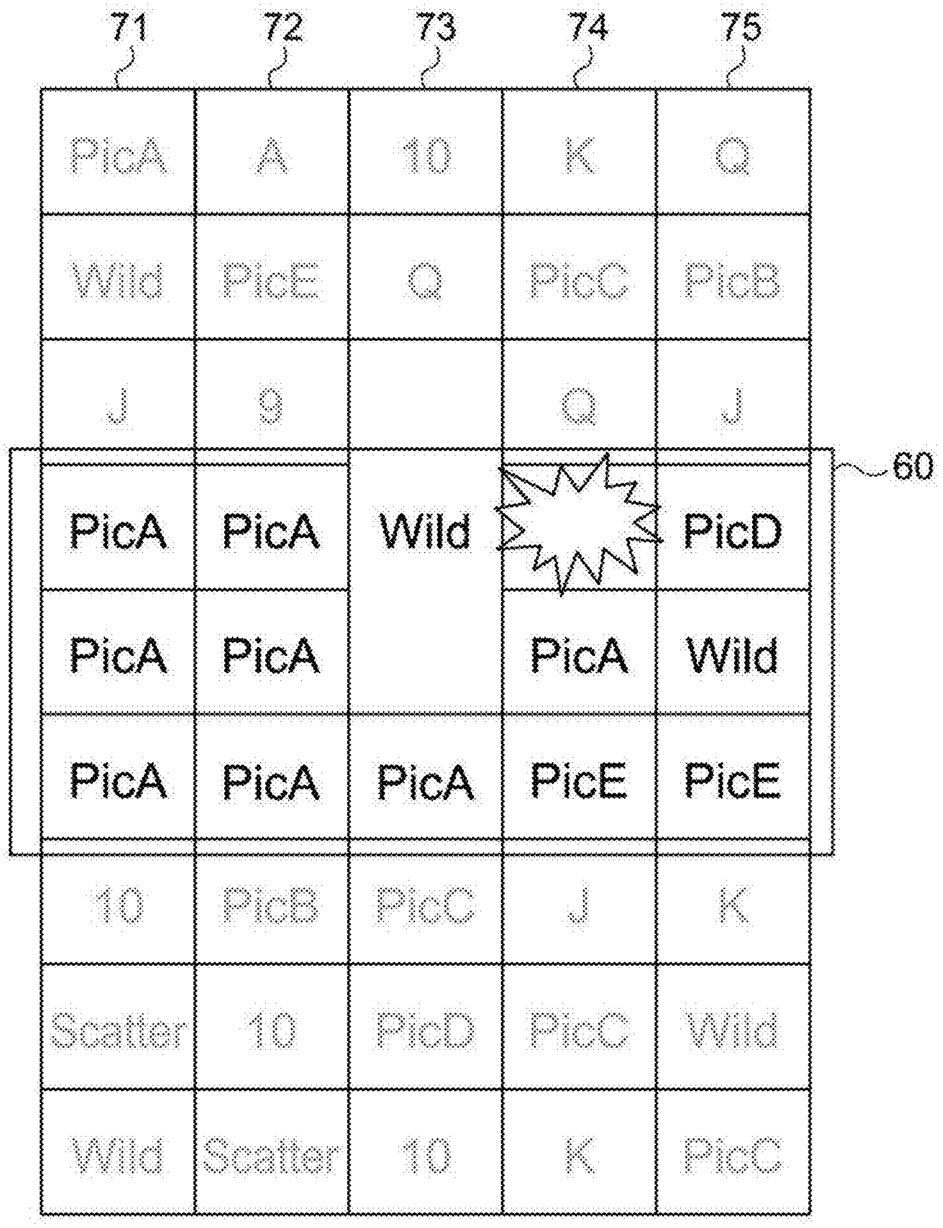
FIG. 12 is a diagram illustrating one state of the symbol array during the update process of the symbol array.

For example, in FIG. 11, because the card symbol "A" still exists on the upper part of the virtual reel strip 74 after the update process of the symbol array, the control unit 50 further repeats the update process to remove the card symbol "A". In other words, the control unit 50 removes the upper card symbol "A" of the virtual reel strip 74 and makes the cell of the position where the card symbol "A" was displayed a blank cell, as illustrated in FIG. 12.

Figure 13:
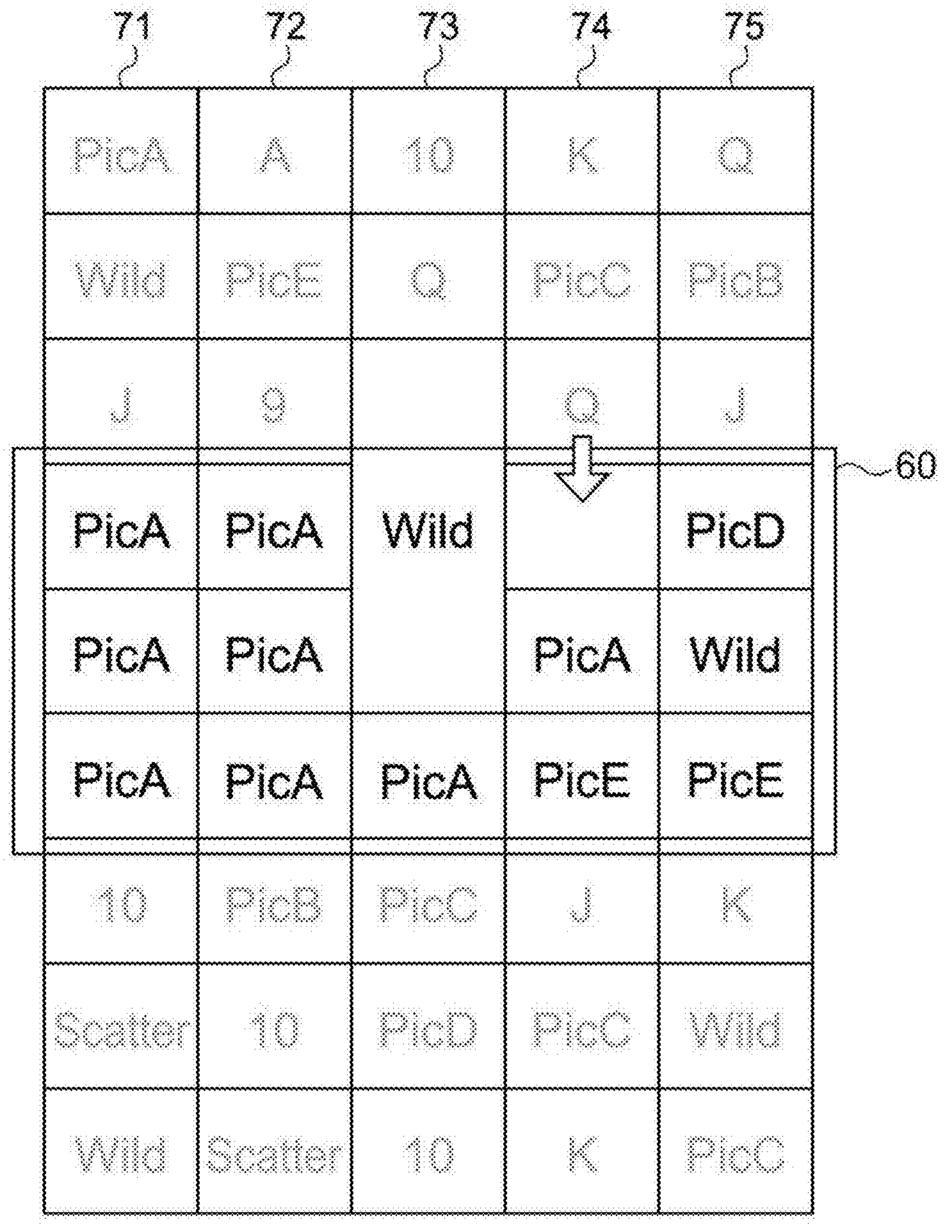
FIG. 13 is a diagram illustrating one state of the symbol array during the update process of the symbol array.

Then, the control unit 50 fills in the blank cell with a following symbol that continues after the removed card symbol "A". In the example illustrated in FIG. 13, the following symbol is a card symbol "Q". The control unit 50 fills in the blank cell by moving the following symbol downward, as illustrated in FIG. 13. By moving the following symbol, the control unit 50 fills in all the blank cells as illustrated in FIG. 14, and displays a symbol in all cells of the symbol display region 60 of the display unit 27.

Figure 14:
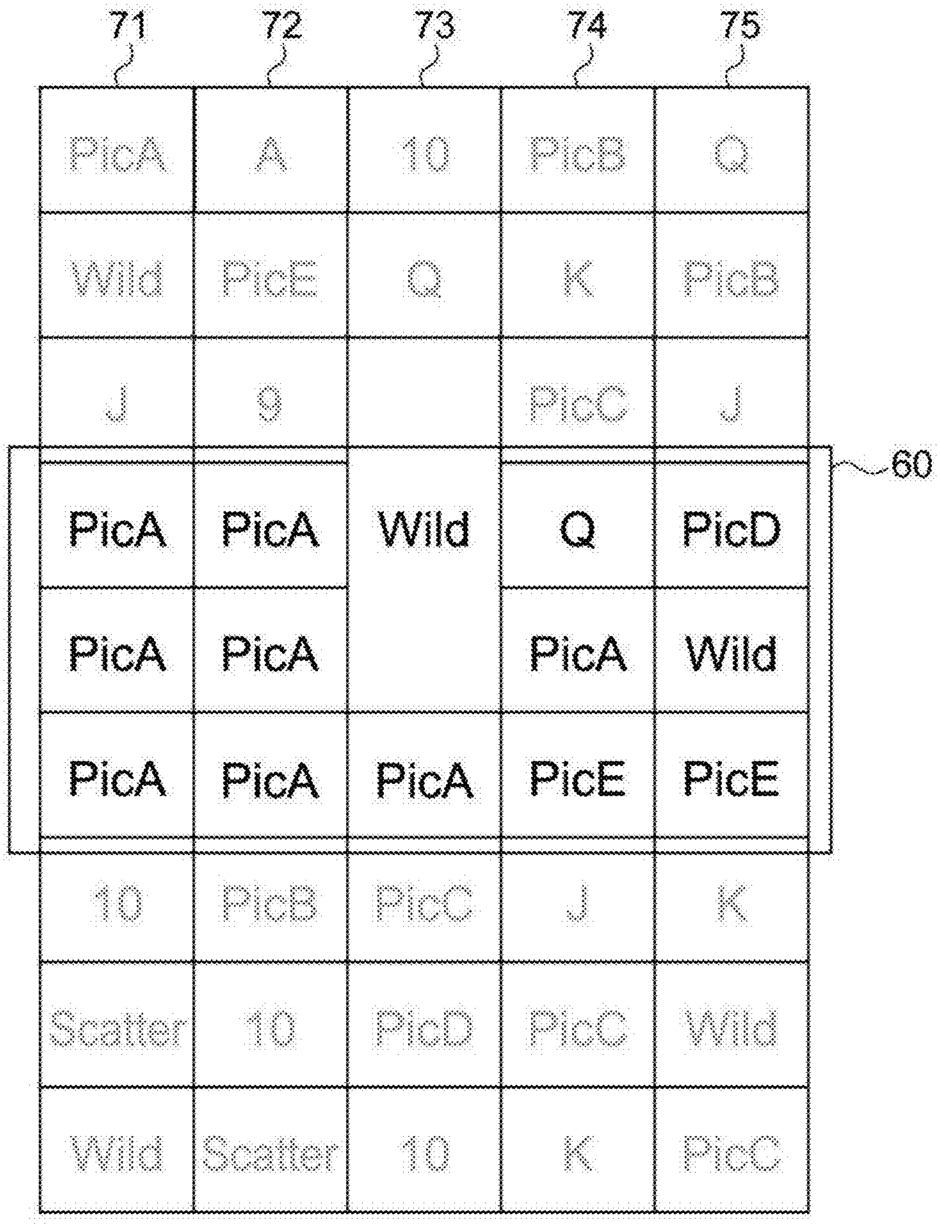
FIG. 14 is a diagram illustrating one state of the symbol array during the update process of the symbol array.
Figure 15:
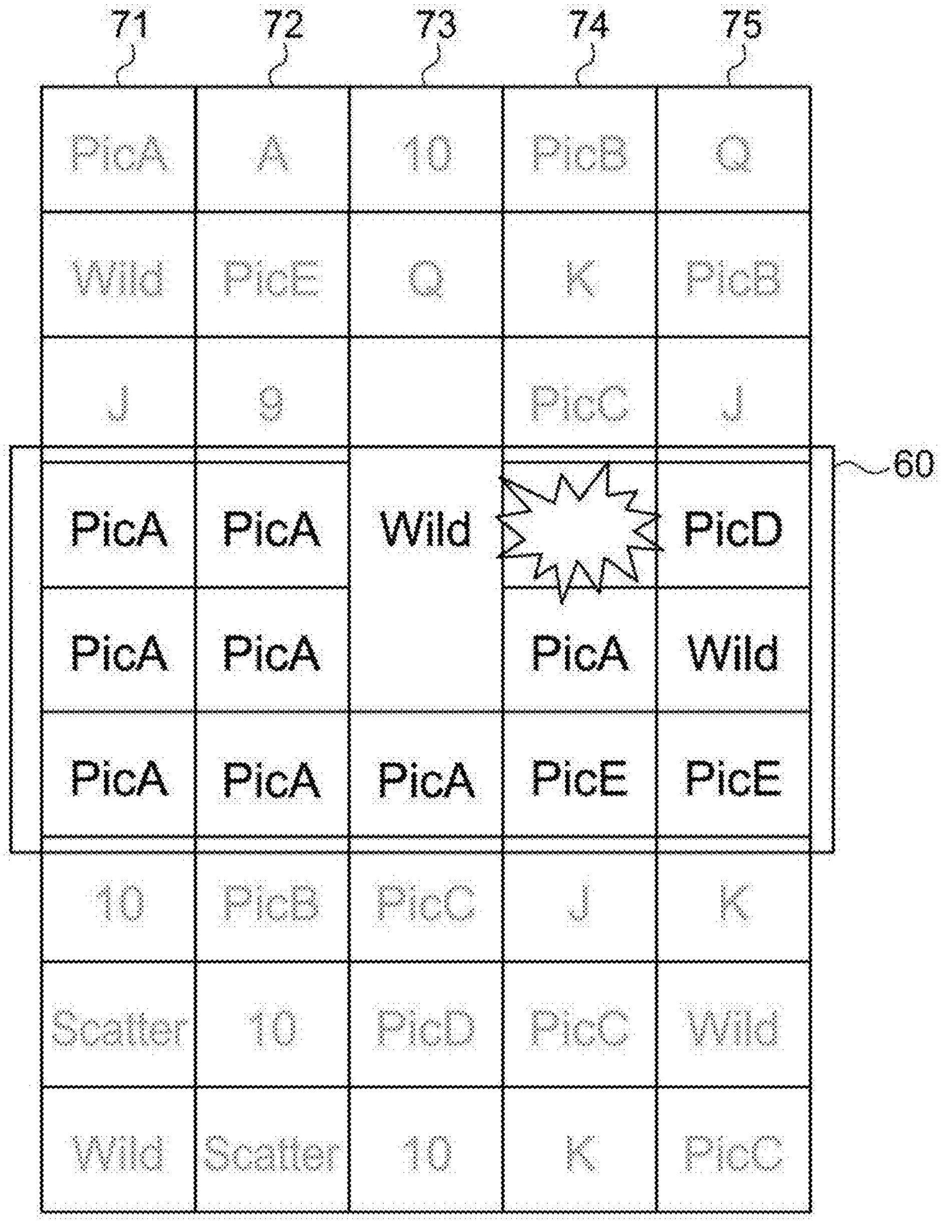
FIG. 15 is a diagram illustrating one state of the symbol array during the update process of the symbol array.

However, in FIG. 14, because the card symbol "Q" still exists on the upper part of the virtual reel strip 74 after the update process of the symbol array, the control unit 50 further repeats the update process to remove the card symbol "Q". In other words, the control unit 50 removes the upper card symbol "Q" of the virtual reel strip 74 and makes the cell of the position where the card symbol "Q" was displayed a blank cell, as illustrated in FIG. 15.

Figure 16:
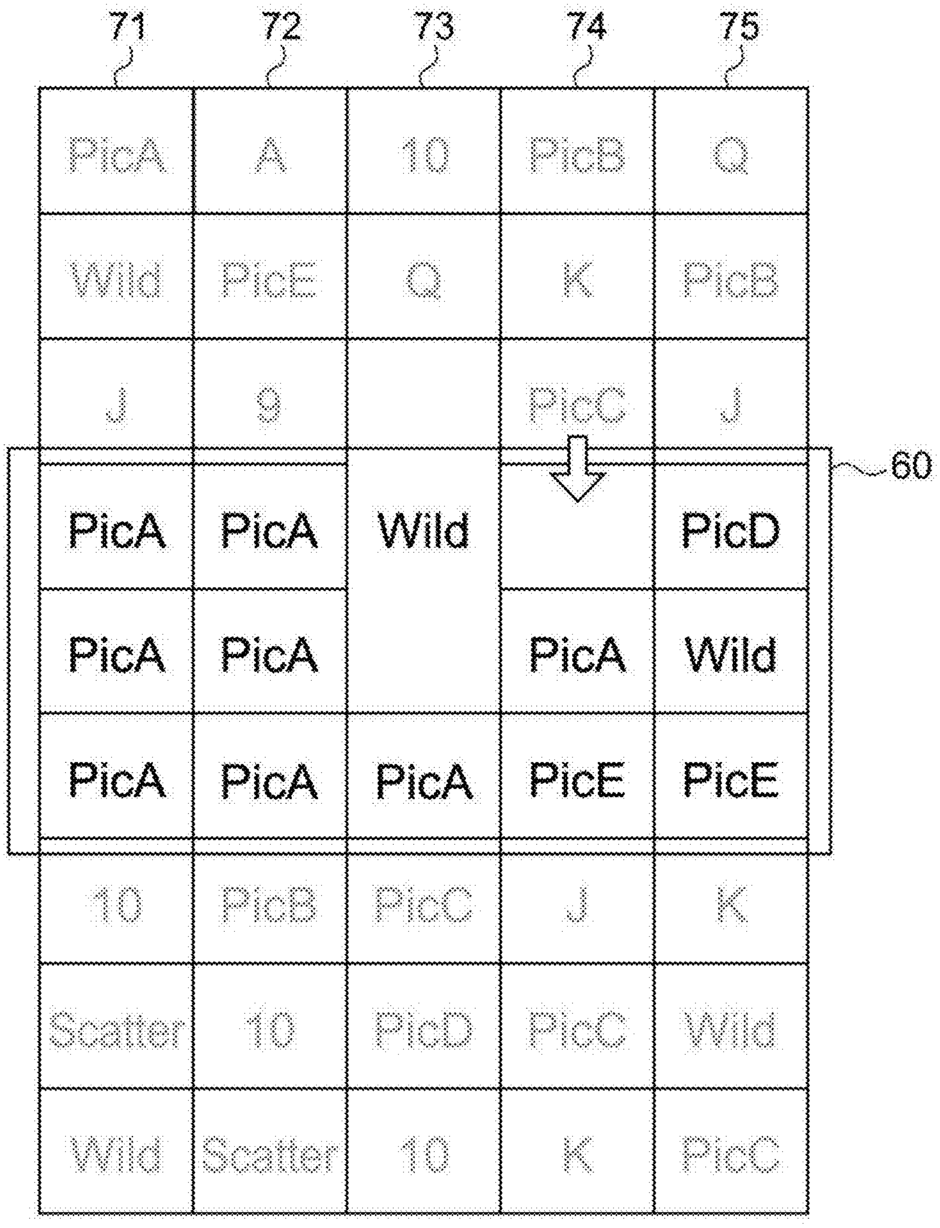
FIG. 16 is a diagram illustrating one state of the symbol array during the update process of the symbol array.

Then, the control unit 50 fills in the blank cell with a following symbol that continues after the removed card symbol "Q". In the example illustrated in FIG. 16, the following symbol is the picture symbol "PicC". The control unit 50 fills in the blank cell by moving the following symbol downward, as illustrated in FIG. 16. By moving the following symbol, the control unit 50 fills in all the blank cells as illustrated in FIG. 17, and displays a symbol in all cells of the symbol display region 60 of the display unit 27.

Figure 17:
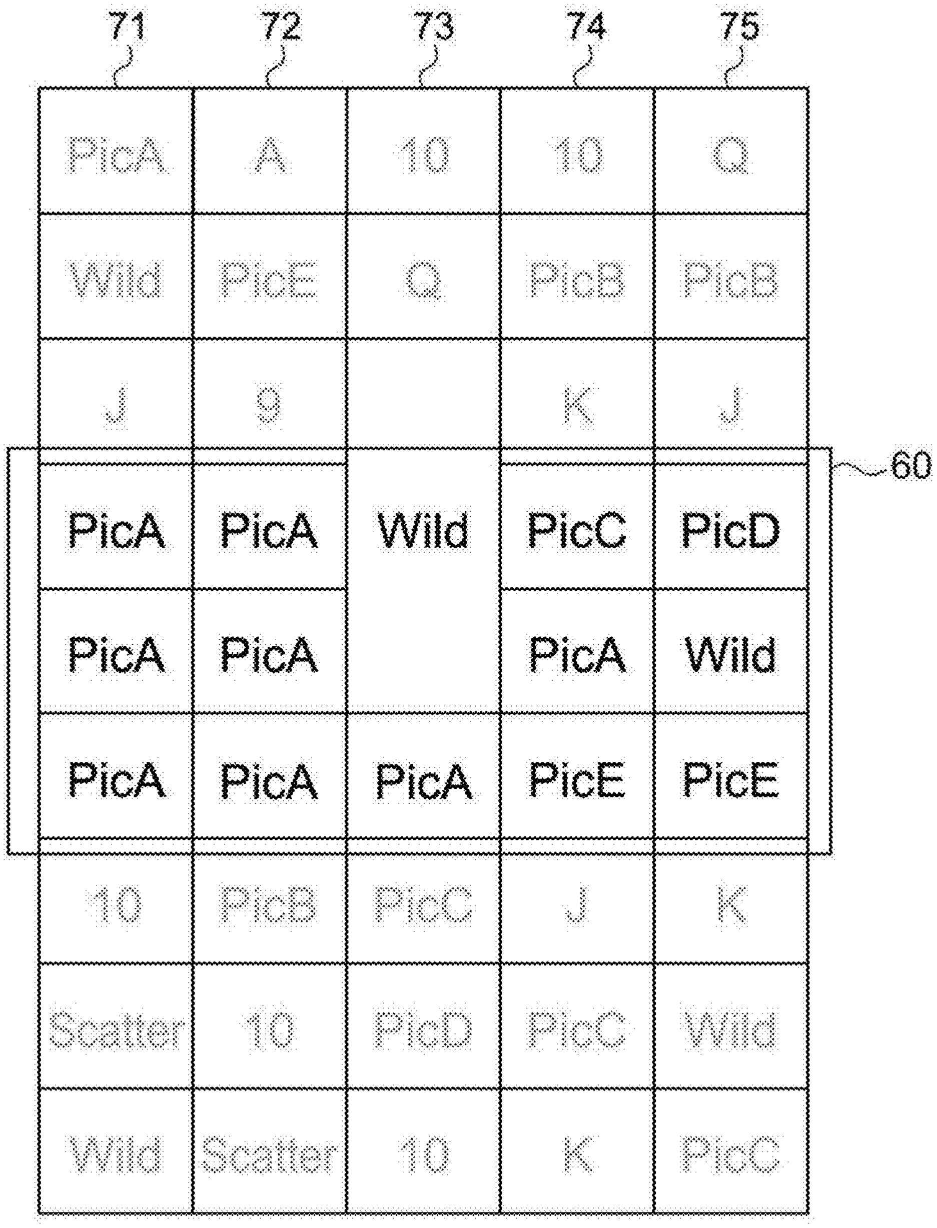
FIG. 17 is a diagram illustrating a state of the symbol array after the update process of the symbol array is completed.

In FIG. 17, the card symbol ceases to exist on the symbol display region 60 of the display unit 27, and the symbol array formed on the symbol display region 60 is configured of only a high-rank symbol (a picture symbol, wild symbol, or scatter symbol). Because of this, the control unit 50 does not perform the update process of the symbol array any further, and the symbol array of the symbol display region 60 is determined.

Figure 18:
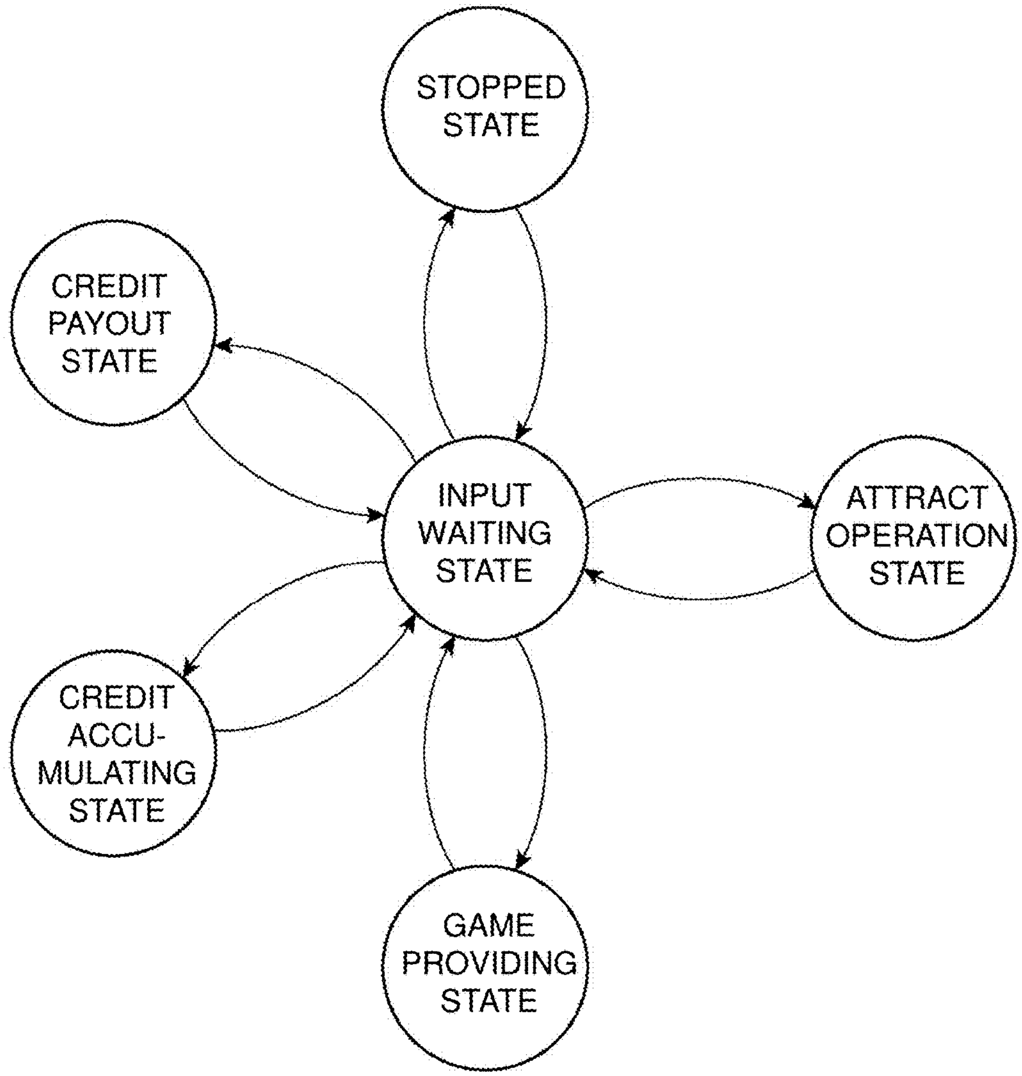
FIG. 18 is a transition diagram of the state of the gaming machine.

Next, an operation of the gaming machine 1 according to the present embodiment will be described while referencing FIG. 18. FIG. 18 illustrates a state transition diagram of the gaming machine 1 according to the present embodiment configured as described above. As illustrated in FIG. 18, the gaming machine 1 takes on each state including a stopped state, an awaiting input state, a credit payout state, a credit accumulation state, an operation attraction state, and a game providing state. Each state is described below.

The stopped state is a state in which the gaming machine 1 is not operating. The gaming machine 1 in the stopped state activates and initializes when accepting a predetermined activation operation, a predetermined program is executed by the control unit 50, a game screen is displayed on the lower display 26, then it enters the awaiting input state.

The gaming machine 1 in the awaiting input state transitions to a credit accumulation state which accumulates corresponding credit information within the gaming machine 1 whenever the bill/credit identification unit 55 identifies a bill or a credit, and returns to the awaiting input state when credit accumulation has ended. Further, the gaming machine 1 in the awaiting input state transitions to the credit payout state which carries out accumulated credit payout processing, when an operation of the payout button is received in a state in which credit information is accumulated, and along with outputting a ticket printed with information corresponding to the credit payout processing from the printer unit 56, accumulated credit within the gaming machine 1 returns to zero. The gaming machine 1, having finished these processes, returns to the awaiting input state.

The gaming machine 1 in the awaiting input state transitions to the operation attraction state which displays an attraction screen on the top display 21 and the bottom display 26, if not operated within a predetermined time. The gaming machine 1 in the operation attraction state returns to an awaiting input state when an operation is received. Note that the attraction screen is a screen meant to draw the attention of customers in the casino to the existence of the gaming machine 1, and is composed of a predetermined image and/or video.

The gaming machine 1 in the awaiting input state sets a line number and a bet number in a game by receiving an operation from a line selection button, a bet number selection button, or a max bet button in a state wherein credit has accumulated within, and along with decreasing credit amount only by a line number multiplied by a credit amount set via reception of the operation of a start button, transitions to a game providing state. In the game providing state, a game is provided according to the flowchart illustrated in FIG. 19. Moreover, it may transition to the game providing state based on an operation from a bet number selection button or a max bet button.

Figure 19:
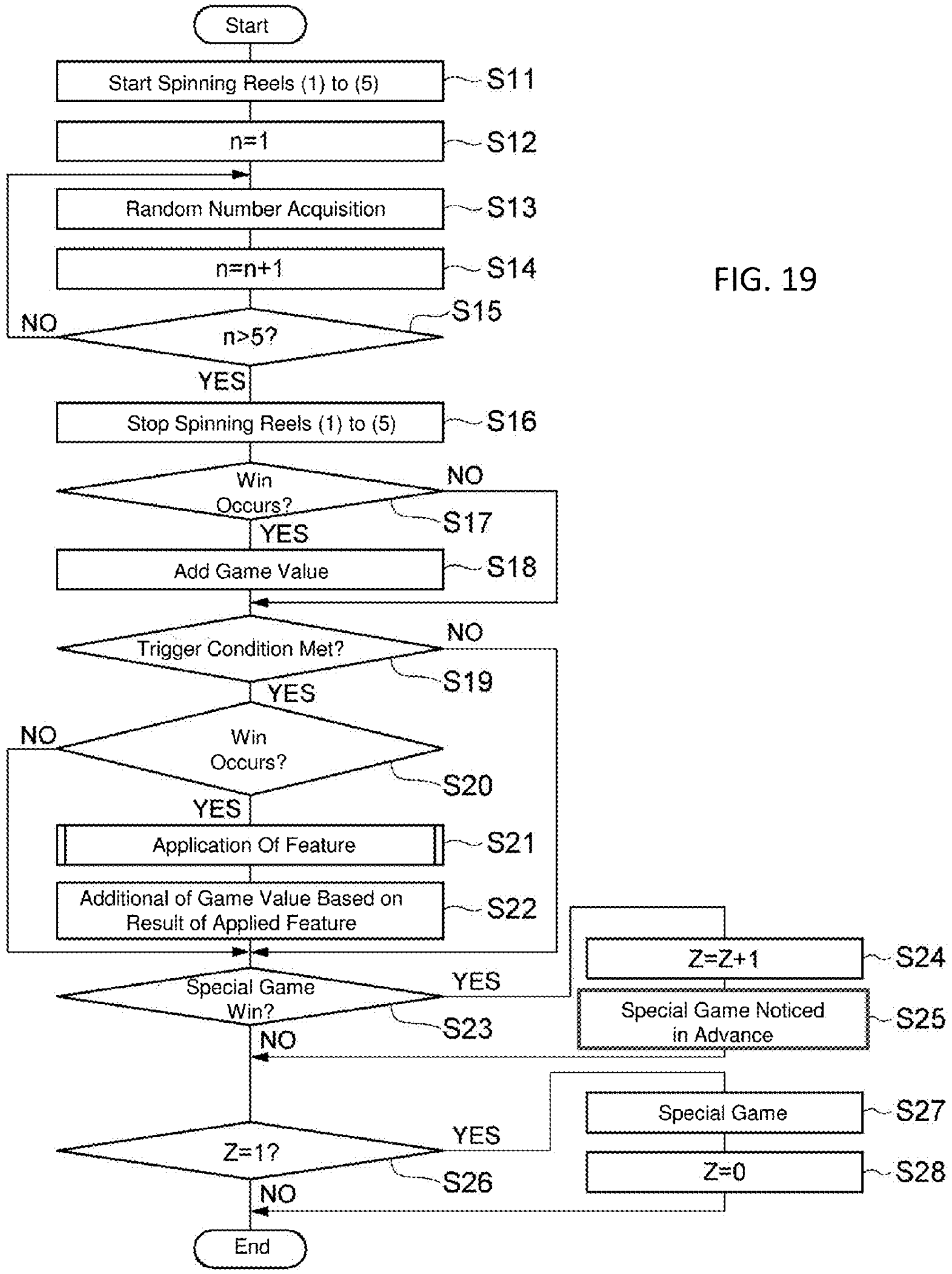
FIG. 19 is a flowchart describing the operation of the gaming machine in FIG. 1.

Below, an operation in the game providing state is described as a method for controlling for the gaming machine 1 while referencing the flow chart illustrated in FIG. 19.

A line number and a bet number are set in the awaiting input state, the gaming machine 1 having transitioned to the game providing state by receiving an operation from the start button starts a normal game by controlling the top display 21 and the bottom display 26 via the control unit 50.

First, a spin of reel (1) through reel (5) being displayed in the symbol display region 60 is started in S11. More specifically, a column of symbols being displayed in the symbol display region 60 are scrolled in a defined order in each corresponding virtual reel strip 71 to 75, and a state where the reels are rotating is virtually displayed. Subsequently, a parameter of n=1 is set as an initial process by the control unit 50 in the S12 process.

Next, in the S13 process, the control unit 50 acquires a random number for determining the stopping position of each reel (n). The means whereby the control unit 50 acquires a random number may be in accordance with the regulations of a jurisdiction where the gaming machine 1 is installed, but is not limited to a particular means. After acquisition of a random number, the process proceeds to S14.

In the S14 process, the control unit 50 is made to be n=n+1. After setting, the process proceeds to S15. In the S15 process, it is determined whether or not the control unit 50 satisfies n>5. When n>5 is not satisfied, the process proceeds to S13. By this, processes S13 to S15 are repeatedly executed until n>5 is satisfied. In S15, when n>5 is satisfied, the process proceeds to S16.

In the S16 process, the control unit 50 determines the stopping position of each reel based on the random number achieved by the process in S13, and stops reels (1) through (5) at the determined stopping positions. More specifically, a symbol column scroll-displayed in the symbol display region 60 is stopped at a stopping position determined for each virtual reel strip 71 to 75.

Here, the stopping positions of the reels (1) through (5) correspond to the stopping positions of the corresponding virtual reel strips 71 to 75. Therefore, the stopping position defines a numerical value or a scope of a numerical value in relation to each symbol in the virtual reel strips 71 to 75, for example, and can determine a position of a symbol related to a numerical value or a scope of a numerical value including an acquired random number. In this case, by unevenly defining a numerical value or a scope of a numerical value related to each symbol, a gradient or a bias in the probability of a stopping position can also be provided.

After the S16 process and in the S17 process, it is determined whether or not a symbol array displayed in the symbol display region 60 satisfies a predetermined condition. In a winning determination, a winning combination of predetermined symbols being established on the pay line (line determination) and/or the appearance of a special symbol (scatter symbol) equal to or greater than a predetermined number in the symbol display region 60 (scatter determination) may be used as examples. However, in the winning determination, conditions are used that are different from the predetermined conditions for providing a special game (feature game and free game). When determined to be a win, a payout, being a predetermined game value (credit) is calculated in an order described below in the S18 process, and added to credit accumulated in the gaming machine 1 by credit corresponding to the calculated payout, to give the calculated payout to the player.

In the process S19 that follows the process S18, in addition to acquiring a random number in the same manner as the process of S13, the control unit 50 determines whether or not the predetermined condition (trigger condition) that use the updating (feature function) of the symbol array described above based on the acquired random number.

When it is determined that a trigger condition applying a feature function is met, in the process of S20, it is additionally determined whether or not a win has occurred in the application of the feature function. Then, when it has been determined that a win has occurred in the application of the feature function in the process of S20, the feature function is actually applied in the following S21.

Here, the process when applying the feature function described above will be described while referring to the flowchart illustrated in FIG. 20.

Figure 8:
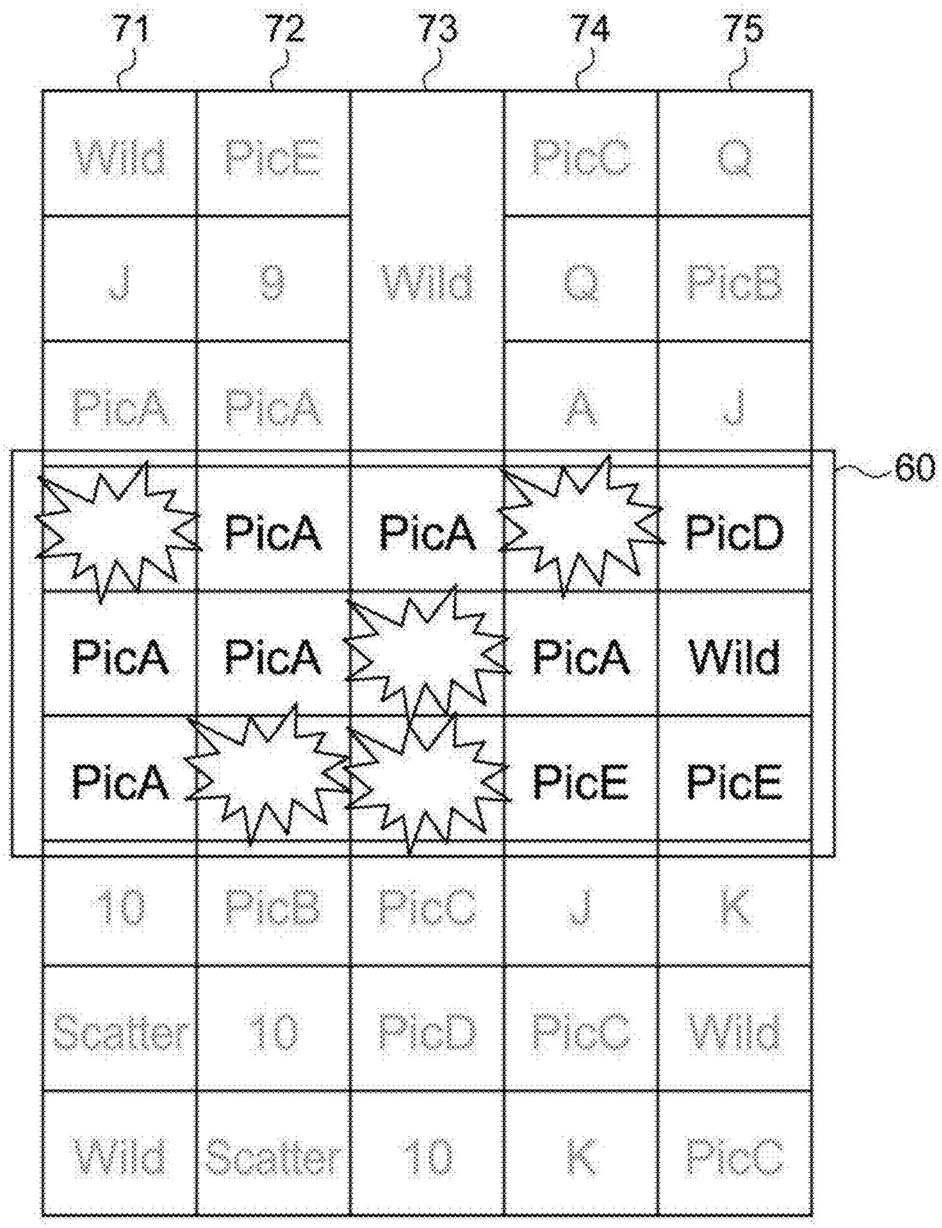
FIG. 8 is a diagram illustrating one state of the symbol array during the update process of the symbol array.
Figure 20:
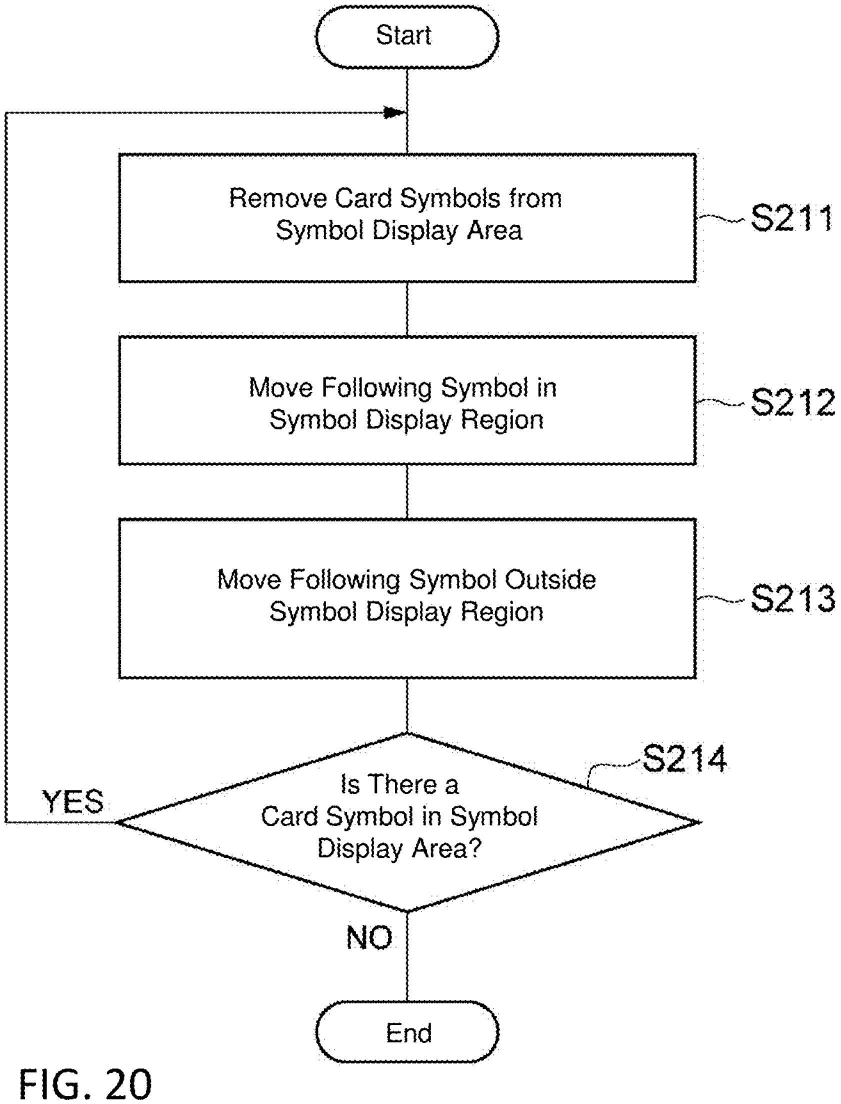
FIG. 20 is a flowchart describing the process S21 in FIG. 19.

As illustrated in FIG. 20, when an application of a feature function is determined, first, as a process of S211, all card symbols displayed on the symbol display region 60 of the display unit 27 are removed, and cells displaying card symbols become blank cells (refer to FIG. 8). Next, in the process of S212 following S211, the following symbol of the card symbols that exist in the region of the symbol display region 60 is moved to the lower side (FIG. 9). Additionally, in the process of S213 following S212, the following symbol that exists outside the region of the symbol display region 60 is moved to the lower side (FIG. 10). As a result, all the blank cells are filled in as illustrated in FIG. 11, and a symbol is displayed in all cells of the symbol display region 60 of the display unit 27.

In the process of S214 following S213, it is determined whether or not a card symbol exists in the symbol display region 60 of the display unit 27. When a card symbol does exist in the symbol display region 60 of the display unit 27, S211 is returned to, and the processes of S211 and S213 are performed again. In other words, by the process of S214, the processes of S211 through S213 are repeated until a card symbol does not exist in the symbol display region 60 of the display unit 27. When a card symbol does not exist in the symbol display region 60 of the display unit 27, the process of the feature function is finished.

Returning to FIG. 19, after performing the feature function in S21, game value is granted regarding the symbol array of the symbol display region 60 after the feature function described above has been applied in the following S22. In other words, as illustrated in FIG. 17, in a symbol array where a card symbol does not exist, that is configured only by a high ranking symbol (picture symbol, wild symbol, or a scatter symbol), a game value is granted based on the winning.

Then when it has been determined that a trigger condition that applies a feature function is met in the determination of S19, when it is determined that there is no winning even after applying the feature function in the determination of S20, and when the granting of a game value is finished in the process of S22, in a process of S23, the control unit 50 determines that a predetermined condition is met wherein a symbol displayed on the symbol display region 60 provides a special game. As a winning condition of a special game, for example, the line determination and/or scatter determination described above can be given.

When it is determined that the predetermined condition that provides a special game is met in S23, a special game providing flag Z is set to Z=1 in S24. After setting the flag in S23, it is noticed in advance that a special game is provided to the upper display 21 or the lower display 26 in S25.

When it is determined in S23 that the predetermined condition that provides a special game is met, it is determined whether the flag Z is set to Z=1 in the process of S26 after S23 when it has been determined that it is met after S25, and the process proceeds to S27 and the control unit 50 provides a predetermined number of free games when it is determined that it is not set to Z=1. When the predetermined condition is met during a free game, instead of providing a special game, a modification such as the addition of a number of free games is added when another predetermined condition is met, and the process proceeds.

When the predetermined number of free games have ended, the flag Z is reset to Z=0 by S28 following S27, and the gaming machine 1 ends the game providing state and returns to the awaiting input state. Further, when it is determined that a flag Z is not set to Z=1 in S26, the gaming machine 1 ends the game providing state and returns to the awaiting input state. The operation in the game providing state described above is then complete.

According to the gaming machine and the game providing means therein according to Embodiment 1 described above, after displaying the symbol array on the symbol display region 60 after stopping the virtual reel strips 71 to 75, an update process (in other words, the removal of the card symbol and the moving of the following symbol) of a symbol array is performed as a process of a feature function, a winning is determined on the symbol array after the update process is performed and a game value is granted based on the determination results.

By the update process, a particular type of symbol in the symbol array (card symbol in the present embodiment) are removed and changed into a following symbol. By removing the particular type of symbol in this manner, the ratio of types of symbols other than the particular type becomes higher in the symbol display region 60, and it is easier to configure a winning combination. In the present embodiment, by the card symbol being removed, the ratio of high ranking symbols (in other words, picture symbols, wild symbols, and scan symbols) increases in the symbol display region 60. Because the chance of winning is higher after the particular type of symbol is removed in this manner, the interest of the player can be maintained or improved after the symbols are removed.

In particular, in the present embodiment, because the card symbols that are symbols with the lowest rank from among the symbols that configure the virtual reel strips 71 to 75 are removed, the ratio of symbols with a high rank increases after the removal of symbols, and a hope of the player for a high payout or a bonus winning rises.

Furthermore, in the present embodiment, because the update process of a symbol array is repeated until the card symbols don't exist, card symbols stop existing on the symbol display region 60, and all symbols in the symbol display region 60 become high ranking symbols. Therefore, the hope of the player for a high payout or a bonus winning is extremely high. However, there is not necessarily a need to repeat the update process of a symbol array until the card symbols don't exist, and a limit to the number of update processes or a limit to the number of symbols removed may be provided if necessary.

Below, the gaming machine of the second embodiment of the present invention will be described. The gaming machine according to the second embodiment, as with the gaming machine according to the first embodiment, receives a predetermined game value from the player, generates a game result, and provides a payout to the player according to the game result. Because the main hardware configuration for the gaming machine according to the present embodiment is the same as the gaming machine 1 according to the first embodiment, descriptions relating to the drawings and hardware configuration are omitted. The configuration of the control unit and the state transitions are also the same, but the application that provides a game is different, and operation in the game providing state is also different. These differences are mainly described below.

Figure 21:
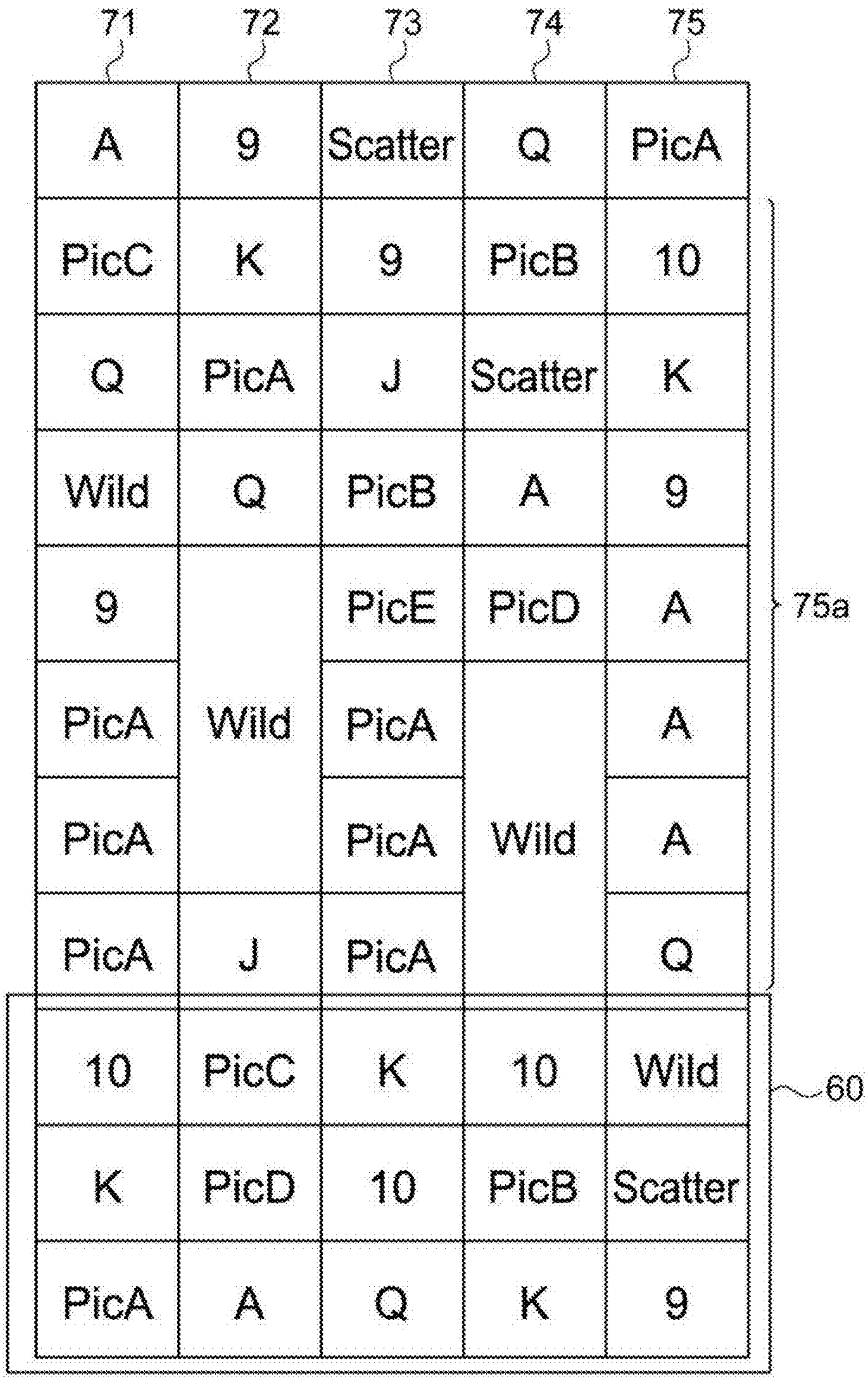
FIG. 21 is a diagram illustrating the state of the symbol array before the update process of the symbol array in the second embodiment.

In the present embodiment, the steps for repeating the process of the feature function are different than that of the first embodiment described above. An example will be described where the control unit 50 displays the symbol array illustrated in FIG. 21 on the symbol display region 60 of the display unit 27 after the virtual reel strips 71 to 75 rotate and stop. As illustrated in FIG. 21, seven connected card symbols 75*a* are positioned outside the region of the symbol display region on the virtual reel strips 75.

Figure 22:
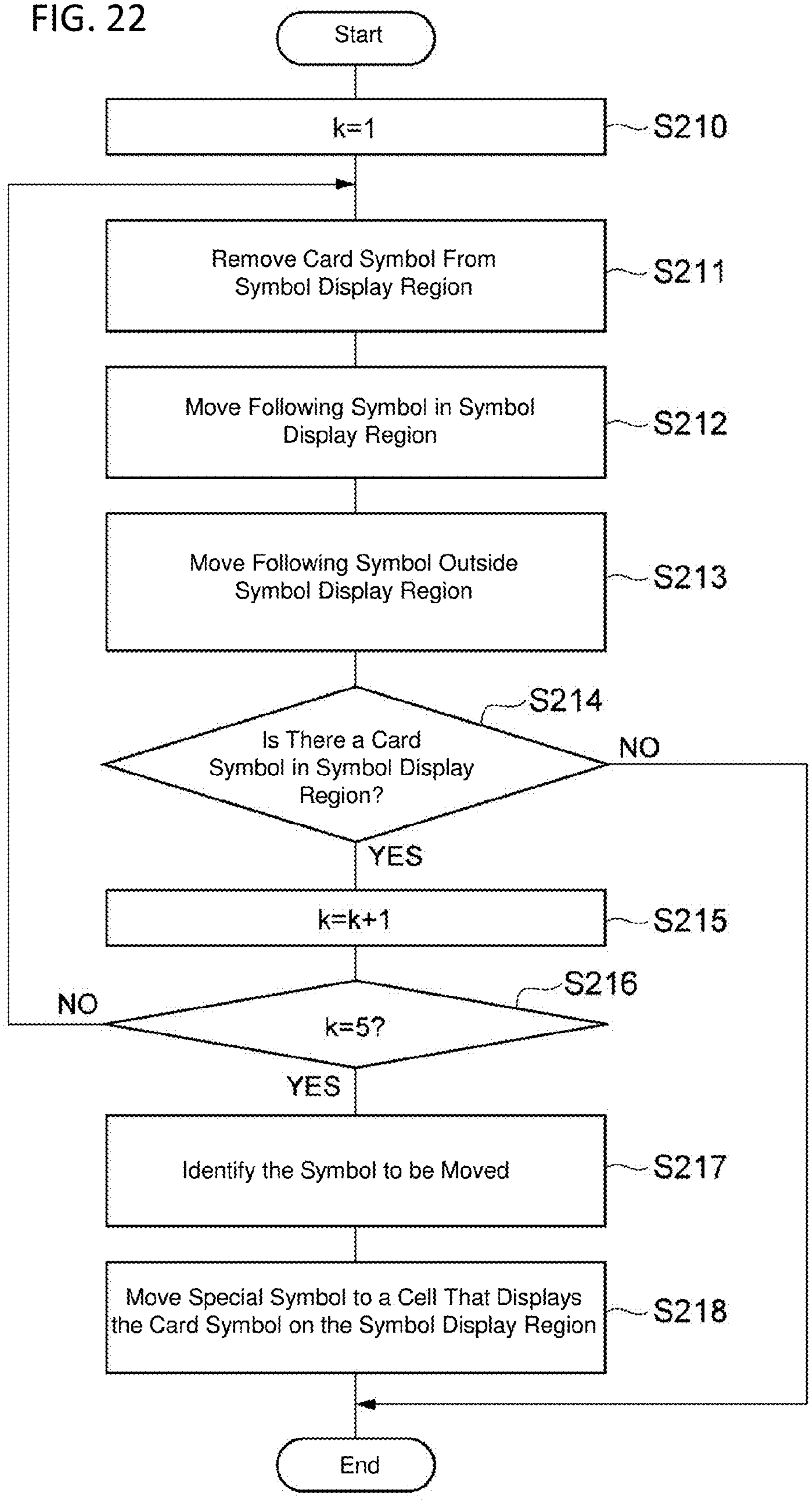
FIG. 22 is a flowchart describing the process S21 in the second embodiment.

With the second embodiment as well, processes proceed along the flow illustrated in FIG. 17 as with the first embodiment, but the process while applying the feature function (S21) is different than the first embodiment. In other words, in the second embodiment, the process of the feature function is performed in the steps illustrated in FIG. 22.

Figure 23:
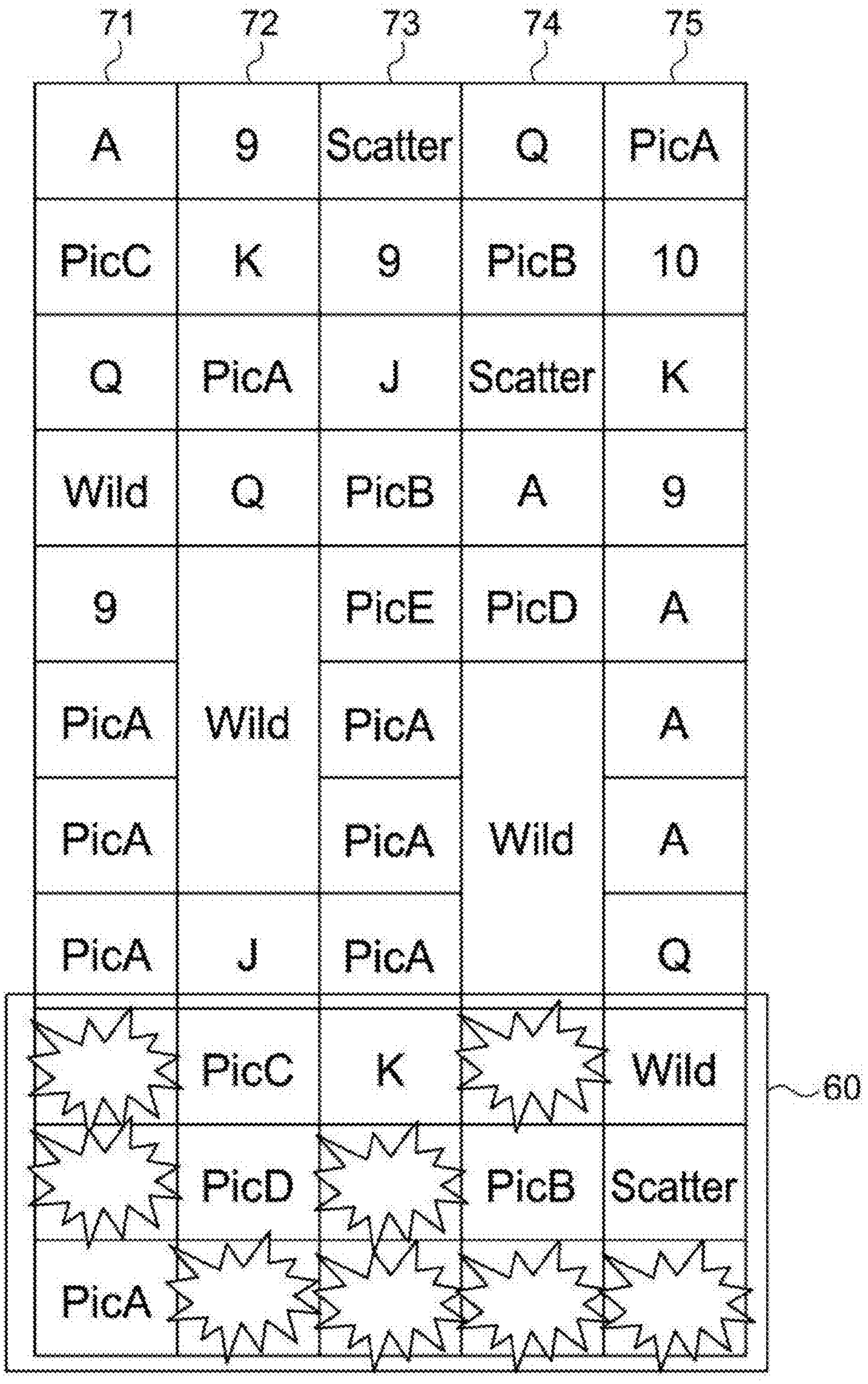
FIG. 23 is a diagram illustrating one state of the symbol array during the update process of the symbol array in the second embodiment.

In the second embodiment, when the application of a feature function is determined, first, the control unit 50 sets a parameter of k=1 relating to the number of processes of the feature function as the process of S210. Next, as the process of S211, all card symbols displayed on the symbol display region 60 of the display unit 27 are removed, and cells displaying card symbols become blank cells. At this time, as illustrated in FIG. 23, the lower card symbol "9" is removed from the virtual reel strip 75, and one blank cell is generated.

In the process of S212 following S211, the following symbol of the card symbols that exist in the region of the symbol display region 60 is moved to the lower side. In other words, the middle scatter symbol and upper wild symbol are moved to the lower side to fill in the blank cell on the virtual reel strip 75.

Additionally, in the process of S213 following S12, the following symbol that exists outside the region of the symbol display region 60 is moved to the lower side. In other words, the card symbol "Q" that is directly above the symbol display region 60 is moved to the lower side on the virtual reel strip 75. As a result, the blank cells are filled in, and a symbol is displayed in all cells of the symbol display region 60 of the display unit 27.

In the process of S214 following S213, it is determined whether or not a card symbol exists in the symbol display region 60 of the display unit 27. When a card symbol does not exist in the symbol display region 60 of the display unit 27, the process of the feature function is finishes, but the process proceeds to S215 when a card symbol does exist. In S215, the control unit is set to k=k+1. After setting, the process proceeds to S216. In the S216 process, it is determined whether or not the control unit 50 satisfies k=5. When k=5 is not satisfied, the process proceeds to S211. By this, processes S211 to S215 are repeatedly executed until k=5 is satisfied. In S216, when k=5 is satisfied, the process proceeds to S217. In other words, when the process of a feature function is repeated five times, the process of the feature function finishes as-is if the card symbols stop existing from the symbol display region 60, and the process proceeds to S217 when a card symbol exists on the symbol display region 60 even if the process of the feature function is repeated 5 times.

In S217, the control unit 50 identifies a symbol finally moved to the symbol display region 60 based on the symbol order of the virtual reel strip as a result of the process of the feature function being repeated. In the virtual reel strip 75 illustrated in FIG. 21, the picture symbol "PicA" positioned on the upper side of the 7 connected card symbols is the final symbol that moves to the symbol display region 60.

In S218 following S217, the control unit 50 does not repeat the process of the feature function after five times, moves the symbol identified in the process of S217 to the cell displaying the card symbol, and replaces card symbol with the symbol identified in the process of S217 (picture symbol "PicA)". As a result, card symbols do not exist in the symbol display region 60 of the display unit 27, and the process of the feature function is finished.

According to the gaming machine and the method for providing a game therein according to the second embodiment described above, as with the gaming machine and method for providing a game therein according to the first embodiment, a particular type of symbol (card symbol in the present embodiment) is removed and replaced by a following symbol by an update process of the symbol array. Because of this, as described above, the interest of a player can be maintained or improved even after the symbols are removed.

Additionally, in the second embodiment, when an update process of a symbol array that exceeds a predetermined number (for example, 5 times) occurs, update processes of the number of symbol array that exceed that predetermined number (processes of the feature function) are omitted. In the second embodiment, when viewed from the arrangement of the virtual reel strip 75, the eight update processes that are necessary conventionally are made to be five update processes. When the update process of a symbol array is not omitted, the update process becomes redundant, and the player may feel that the game is boring. Because of this, in the second embodiment, such a problem is avoided by partially omitting the update process of a symbol array.

Figure 24:
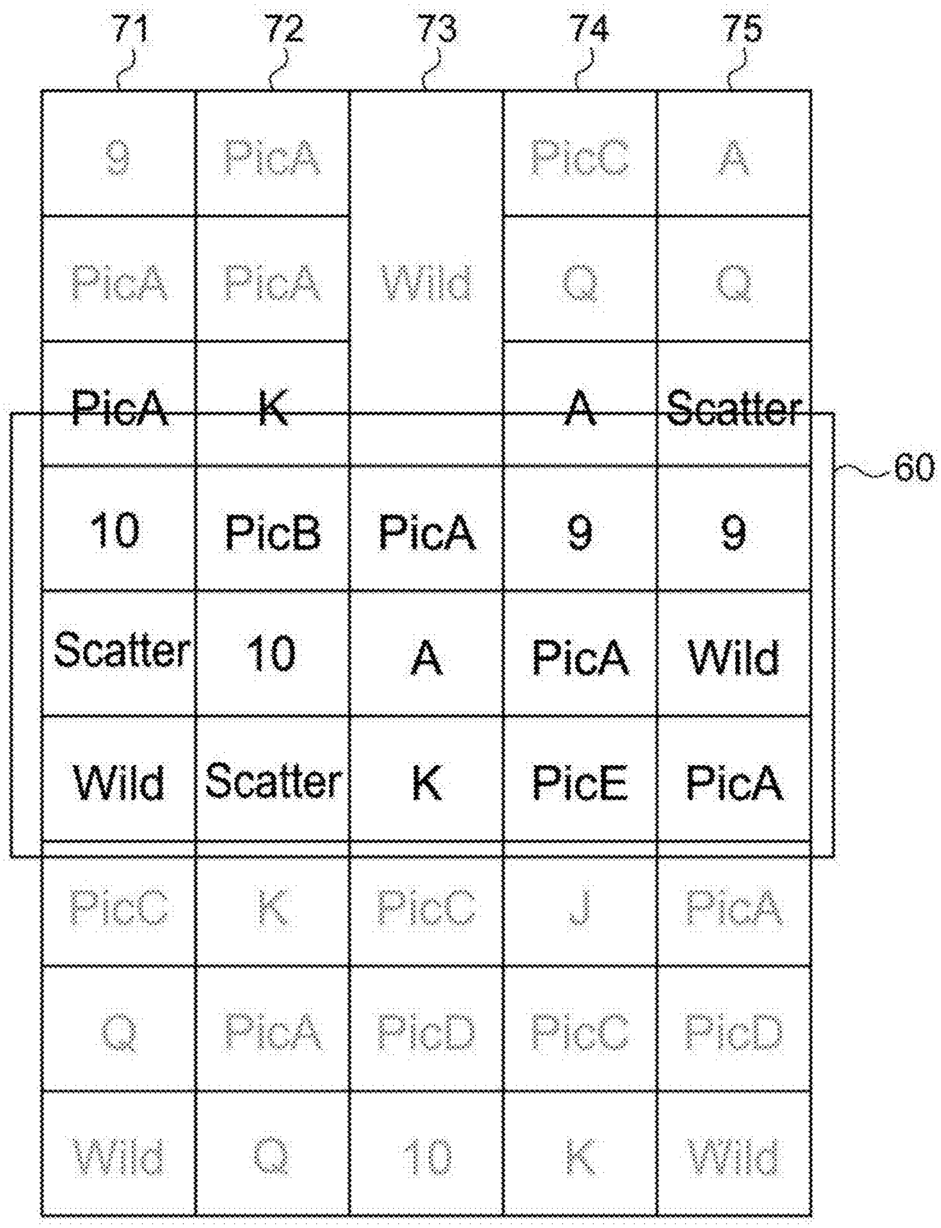
FIG. 24 is a diagram illustrating the symbol display region of a different display mode.

Note that, as described in the first embodiment and the second embodiment, because the type of following symbol that moves affects the winning payout to fill in a blank cell, the player tends to have interest in the type of following symbol. In particular, the player has a strong interest in the following symbol that moves from outside the region of the symbol display region 60 into the region. As illustrated in FIG. 24, one portion of a symbol after one symbol displayed on the symbol display region 60 in the rotation direction of the reel may be made to display visibly to the user on the upper edge of the symbol display region 60. For example, it is possible that one portion of the symbol is continued to be displayed when the reel stops and is displayed, and that one portion of a symbol is displayed only for an instant right before the reel stops and is displayed. By displaying one portion of a symbol one after a symbol displayed on the symbol display region 60, the player can distinguish the symbol, or can guess the symbol. Because of this, the player can estimate to an extent the symbol array after the process of a feature function is executed, and on account of this, for example, it can give the player a feeling of nearly missing a high payout, and the interest of the player in the occurrence of a feature function process increases.

In the example illustrated in FIG. 24, when scatter symbols exist on each column corresponding to the virtual reel strips 71 and 72 on the symbol display region 60, and when one more scatter symbol exists on the symbol display region 60, a bonus winning happens by the scatter determination. At this time, the player can have hope that the scatter symbol of the virtual reel strip 75 with only one portion displayed on the upper edge of the symbol display region 60 will move into the symbol display region 60 by a feature performance, and the interest of the player in the occurrence of a feature function process increases.

In the above described first embodiment and the second embodiment it was described that a particular type of symbol is decided beforehand, but the type of particular type of symbol or number of types may be dynamically changed. In other words, the particular type of symbol described above is not limited to a card symbol. The changing of the type of particular type of symbol or number of types can be performed by the control unit 50, or by the player. The control unit 50 may be made to increase the number of types of a particular type of symbols for a predetermined time period only (for example, only during a free game). The player can perform a direction input for changing the type of particular type of symbol or number of types by using the operation unit 44 during a trigger time of starting time of a special game. Additionally, the number of types of a particular type of symbols may be increased based on the game value input by the user.

When a symbol is removed in the update process of the symbol array described above, the virtual reel strip may be made so that the removed symbol does not exist from the next game onward. For example, the control unit 50 can provide a free game using a virtual reel strip wherein the removed symbol does not exist. At this time, because the ratio of symbols other than the particular type is higher in the reel, and it is easier to form a winning combination by the symbols other than the particular type, it is easier to achieve a high payout in such a free game.

Note that the function of the control unit 50 in the gaming machine 1 described above may even be achieved via the execution of a program by a computer. That is, development of one or a plurality of computers wherein a program that functions similar to the control unit 50 described above is possible. A function achieved by executing this type of program is the same as the control unit 50 described above, that is, a function that rotates the plurality of reels based on the player operating the operation unit, a function that stops the rotation of the plurality of reels and displays a plurality of symbols on a display unit, a function that removes all symbols of a particular type from the display unit, a function that fills in the position of the removed symbol by moving a following symbol in the rotational direction of the reel after the removed symbol, and a function that grants an award based on a symbol array that is formed on the display unit after the following symbol is moved is realized.

The program described above, for example, can provide recording on a recording medium readable by a computer such as a ROM or a semiconductor memory.

As described above, the gaming machine according to the embodiment of the present invention is provided with an operation unit that receives an operation from a player, a display unit that partially displays a plurality of reels each having a series of symbols, and a control unit, connected to the operation unit and the display unit, that rotates and stop the plurality of reels based on a player operating the operation unit and that grants an award for a symbol array formed on the display unit by the stopped plurality of reels, wherein the control unit, after displaying a plurality of symbols on the display unit by stopping the plurality of reels, removes all symbols of a particular type from the display unit, fills in the position of the removed symbol by moving a following symbol in the rotational direction of the reel after the removed symbol, and grants an award based on a symbol array that is formed on the display unit after the following symbol is moved.

In this type of gaming machine, by performing an update process of a symbol array by the removing of symbols of a particular type and moving a following symbol, the ratio of types of symbols other than the particular type becomes higher in the symbol array formed on the display unit, and it is easier for the symbol array to configure a winning combination. Because the chance of winning is higher after the particular type of symbol is removed in this manner, it is possible to provide a new type of game where the interest of the player can be maintained or improved after the symbols are removed.

Furthermore, when the following symbol displayed on the display unit is a symbol of a particular type, the removal and moving of the following symbol is repeated until the type of special symbol no longer exists on the display unit, and may grant an award based on a symbol array of the display unit where a symbol of a particular type does not exist. In this case, because symbols of a particular type do not exist in the symbol array, and the symbol array is configured only by symbols of a type other than the particular type, chances of winning are further raised, and the hopes of the player for a high payout or bonus winning become higher. In addition, because the time for the update process of a symbol array becomes longer and the symbol array on the display unit changes consistently, an excellent experience can be provided by giving the player a feeling of hope and suspense over a comparatively long period of time.

Moreover, the plurality of symbols may include a first symbol set, and a second symbol set more advantageous in granting an award than the first symbol set, and may be a symbol wherein a symbol of a particular type is included in the first symbol set. For example, the five types of card symbols described above are the first symbol set, and the seven types of high ranking symbols described above are the second symbol set. In this case, because the symbols of the display unit are changed to symbols of a high rank advantageous for an award, the hope of the player for a high payout or bonus winning rises.

Furthermore, the control unit may be made to display one portion of a symbol after one symbol displayed on the symbol display in the rotation direction of the reel, visibly to the user on the display unit. In this case, the player can distinguish the symbol, or can guess the symbol. Because of this, the player can estimate to an extent the symbol array after the update process of a symbol array is performed, for example, it can give the player a feeling of nearly missing a high payout, and as a result, the interest of the player in the occurrence of an update process of the symbol array increases.

Moreover, the operation unit receives a type of symbol that is made to be a particular type of symbol from the player before the plurality of reels rotate, and the control unit may remove the type of symbol received from the player as a symbol of a particular type. In this case, the type of the particular type of symbol is selected at the discretion of the player. As a result, the selection and decision of the player is reflected in the game result. By this, the interest of the player in the game rises, and the player becomes more immersed in the game.

Furthermore, the control unit may determine the type of one or a plurality of symbols from among the plurality of symbols before the plurality of reels rotate, and may remove the type of symbol determined as a symbol of a particular type. In this case, the control unit can determine the symbol of a particular type following a rule or algorithm that determines a symbol of a particular type determined beforehand. Furthermore, the control unit can also simply update the symbol of a particular type by determining again the symbol of a particular type.

Moreover, the control unit may change the number of types of symbols of a particular type when a predetermined game condition is established. For example, when a number of types of symbols of a particular type increase, the symbol array changes largely before performing the update process of the symbol array and after performing the update process of the symbol array compared to before removal. Because of this, even if the symbol array has no winning payout or a low payout before performing the update process of the symbol array, it is possible to have a symbol array of a high payout after the update process of the symbol array. Therefore, the hope of the player for the occurrence of an update process of the symbol array rises.

Furthermore, the control unit may provide a next game using the reel after removing the symbol of a particular type. In this case, the ratio of symbols other than the particular type increases in the reel, and it becomes easier to form a winning combination by the symbols other than the particular type. As a result, the chance of a high payout or bonus winning rises, and the hope of the player increases.

Furthermore, the control unit may provide a normal game, and a special game that is more advantageous to the player than the normal game, and during a special game, the control unit, after displaying a plurality of symbols on the display unit by stopping the plurality of reels, removes all symbols of a particular type from the display unit, fills in the position of the removed symbol by moving a following symbol in the rotational direction of the reel after the removed symbol, and grants an award based on a symbol array that is formed on the display unit after the following symbol is moved. The feature game (first special game) and free game (second special game) described above are included in the special game.

The present invention is not limited to the first embodiment and the second embodiment described above, and various modifications are possible. For example, in the embodiments described above, a gaming machine that provides a game via a slot machine is described, but is not limited to this, games of an embodiment such as video card games such as poker, blackjack, and bingo, keno, and wheel games may also be provided. Further, the present invention can also be applied to a pachinko machine or a pachislot machine.

Moreover, various modifications are possible for the operation in each embodiment, and as an example, it may be that where the reel stopping position is determined by acquiring random numbers of a necessary amount beforehand, and displaying in order the contents on the display after finishing the determination of a special game winning and presence or absence of a winning. In addition, for example, the control unit 50 may acquire the necessary number of random numbers at once when the game starts, and store each random number in a storage region of the memory 53 or the storage 54 that is not deleted during a power outage. When done in this manner, even if a power outage occurs, the control unit 50 can reproduce the proceedings of a game by acquiring the random numbers acquired when the game started before the power outage from the memory 53 or the storage 54 when reopening the game after the restoring of power takes place. For example, when a game result obtaining a high payout is formed right before a power outage occurs, the player will be greatly dissatisfied if the progress of the game is not the same after power is restored. However, as mentioned above, when the game starts all of the random numbers are acquired at once, and by saving these random numbers in the memory 53 or the storage 54, such great dissatisfaction can be avoided for the player because the progress of a game the same as before a power outage occurred can be reproduced after restoring power.

Further, in the embodiment, a bill or ticket is displayed as game value, and received by these bill/ticket identification devices, and it was described where a ticket is output by a printer unit, but the present invention is not limited to this. The game value is a concept including tangible objects such as a coin, bill, coin, medal, ticket, and the like, or electronic data that has a value equivalent to these. For example, a coin is received by a coin acceptor, and a coin may be paid by a coin hopper. A player may be identified and credit that is accumulated in an account on a server may be used, and credit may be paid to this account, information of credit stored in a storage medium of a magnetic card, IC card and the like may be read and used, and credit may be paid out by writing to the storage medium.

Further, it is illustrated in the embodiments described above that all symbols of a particular type are removed from the symbol array, but one portion of the symbols of a particular type may be removed from the symbol array.

Moreover, when the symbol above a symbol of a particular type is set to a symbol of a high rank (for example, a wild symbol), the symbol of a particular type is removed during the update process of the symbol array, and the symbol of a high rank is brought over to the symbol display region. In other words, the update process of the symbol array being performed means that a high payout or bonus winning is acquired. Because of this, an improvement in game properties is achieved using the update process of the symbol array.

Further, predetermined conditions providing a special game are not limited to scatter determination or line determination, and, for example, there may be a configuration providing a special game when the bet number surpasses a predetermined value. There can also be a configuration providing a special game according to a value of the random number acquired during a regular game.

Further, in the embodiment, it was illustrated that a free game is provided for a predetermined number of times as a special game, but a special game may be provided without a limit to a number of times. In this situation, there can be a configuration providing a special game until an end condition is satisfied, with the value of a random number acquired during a special game is the end condition of a special game.

Further, in an embodiment described above, an embodiment that triggers the feature function by mystery trigger based on random number is described, but the feature function may be triggered by a combination of specific symbols, a play history of the player, an accumulated game result, a result of sub-game, a result of bonus game or a command from server of casino/slot management system and the like.

1 . . . Gaming machine, 21 . . . Upper display, 26 . . . Lower display, 27 . . . Display unit, 44 . . . Operation unit, 50 . . . Control unit, 51 . . . CPU, 60 . . . Symbol display region, 64 . . . Cell, 70 . . . Virtual reel set, 71 to 75 . . . Virtual reel strip.

What is claimed is:

1. A gaming machine, comprising:

an operation unit that accepts operation by a player;

an acceptor device configured to accept media associated with a monetary value to establish a credit balance;

a display unit coupled to the operation unit and being configured to display a grid having a plurality of display elements in a predetermined arrangement forming a plurality of rows and columns, wherein each column of the grid forms a respective reel, each reel having an associated virtual reel strip, each virtual reel strip having symbols disposed thereon, the symbols on the virtual reel strips are from a set of symbols, the symbols in the set of symbols have a ranking from lower to highest; and a control unit connected to the operation unit, the acceptor device, and the display unit, the control unit configured to receive a signal from the acceptor device indicating a wager being made by the player on a game, adjust the credit balance by an amount of the wager, and rotate and randomly stop the plurality of virtual reel strips to display a plurality of symbols within the grid, the displayed symbols forming a first outcome, the control unit being further configured to perform a set of secondary steps, the secondary steps including:

removing all symbols of a particular type of symbol from the first outcome, the symbols of the particular type of symbol having corresponding symbol rankings that are less than a predetermined symbol ranking; and, filling the display element of any removed symbol from the first outcome by moving a following symbol from the respective virtual reel strip in a rotational direction of the respective reel into the respective display element, forming a second outcome;

wherein the particular type of symbol is determined as a function of the wager input by the player.

2. The gaming machine, as set forth in claim 1, wherein the secondary steps are repeated if a symbol of the particular type is within the second outcome.

3. The gaming machine, as set forth in claim 1, wherein the secondary steps are performed by the control unit in response to a triggering condition.

4. The gaming machine, as set forth in claim 3, wherein the triggering condition is within the first outcome.

5. The gaming machine, as set forth in claim 1, wherein the predetermined ranking is one of fixed and dynamically determined.

6. The gaming machine, as set forth in claim 1, wherein the gaming machine provides main game and a feature game, wherein the secondary steps are performed in the feature game.

7. The gaming machine, as set forth in claim 6, wherein the feature game includes a predetermined number of free spins.

8. The gaming machine, as set forth in claim 1, wherein the control unit awards a payout to the player as a function of the first outcome.

9. The gaming machine, as set forth in claim 1, wherein the control unit awards a payout to the player as a function of the second outcome.

10. The gaming machine, as set forth in claim 1, wherein the grid is displayed within a display region, wherein the at least a portion of a symbol from each virtual reel strip is visible above a top row when the reels are stopped.

11. A gaming machine, comprising:

an operation unit that accepts operation by a player;

an acceptor device configured to accept media associated with a monetary value to establish a credit balance;

a display unit coupled to the operation unit and being configured to display a grid having a plurality of display elements in a predetermined arrangement forming a plurality of rows and columns, wherein each column of the grid forms a respective reel, each reel having an associated virtual reel strip, each virtual reel strip having symbols disposed thereon, the symbols on the virtual reel strips are from a set of symbols, the symbols in the set of symbols have a ranking from lower to highest; and a control unit connected to the operation unit, the acceptor device, and the display unit, the control unit configured to receive a signal from the acceptor device indicating a wager being made by the player on a game, adjust the credit balance by an amount of the wager, and rotate and randomly stop the plurality of virtual reel strips to display a plurality of symbols within the grid, the displayed symbols forming a first outcome, the control unit being further configured to perform a set of secondary steps, the secondary steps including:

removing all symbols of a particular type of symbol from the first outcome, the symbols of the particular type of symbol having corresponding symbol rankings that are less than a predetermined symbol ranking; and, filling the display element of any removed symbol from the first outcome by moving a following symbol from the respective virtual reel strip in a rotational direction of the respective reel into the respective display element, forming a second outcome, wherein a number of types of the particular type of symbol may be increased based on the wager.

12. The gaming machine, as set forth in claim 11, wherein the particular type of symbol is determined as a function of the wager input by the player.

13. A gaming machine, comprising:

an operation unit that accepts operation by a player;

an acceptor device configured to accept media associated with a monetary value to establish a credit balance;

a display unit coupled to the operation unit and being configured to display a grid having a plurality of display elements in a predetermined arrangement forming a plurality of rows and columns, wherein each column of the grid forms a respective reel, each reel having an associated virtual reel strip, each virtual reel strip having symbols disposed thereon, the symbols on the virtual reel strips are from a set of symbols, the symbols in the set of symbols have a ranking from lower to highest; and a control unit connected to the operation unit, the acceptor device, and the display unit, the control unit configured to receive a signal from the acceptor device indicating a wager being made by the player on a game, adjust the credit balance by an amount of the wager, and rotate and randomly stop the plurality of virtual reel strips to display a plurality of symbols within the grid, the displayed symbols forming a first outcome, the control unit being further configured to perform a set of secondary steps, the secondary steps including:

removing all symbols of a particular type of symbol from the first outcome, the symbols of the particular type of symbol having corresponding symbol rankings that are less than a predetermined symbol ranking; and, filling the display element of any removed symbol from the first outcome by moving a following symbol from the respective virtual reel strip in a rotational direction of the respective reel into the respective display element, forming a second outcome, wherein the particular type of symbol may be modified to increase or decrease a number of symbols within the particular type of symbol.

14. The gaming machine, as set forth in claim 13, wherein the particular type of symbol may be modified by the control unit or by the player.

15. The gaming machine, as set forth in claim 13, wherein the modification of the particular type of symbol may expire after a predetermined number of spins.

16. A gaming machine, comprising:

an operation unit that accepts operation by a player, an acceptor device configured to accept media associated with a monetary value to establish a credit balance;

a display unit coupled to the operation unit and being configured to display a grid having a plurality of display elements in a predetermined arrangement forming a plurality of rows and columns, wherein each column of the grid forms a respective reel, each reel having an associated virtual reel strip, each virtual reel strip having symbols disposed thereon, the symbols on the virtual reel strips are from a set of symbols, the symbols in the set of symbols have a ranking from lower to highest; and a control unit connected to the operation unit, the acceptor device, and the display unit, the control unit configured to receive a signal from the acceptor device indicating a wager being made by the player on a game, adjust the credit balance by an amount of the wager, and rotate and randomly stop the plurality of virtual reel strips to display a plurality of symbols within the grid, the displayed symbols forming a first outcome, the control unit being further configured to perform a set of secondary steps, the secondary steps including:

removing all symbols of a particular type of symbol from the first outcome, the symbols of the particular type of symbol having corresponding symbol rankings that are less than a predetermined symbol ranking; and filling the display element of any removed symbol from the first outcome by moving a following symbol from the respective virtual reel strip in a rotational direction of the respective reel into the respective display element, forming a second outcome;

wherein the gaming machine provides main game and a feature game, wherein the secondary steps are performed in the feature game;

wherein the feature game includes a predetermined number of free spins; and wherein any removed symbol remains removed from the respective virtual reel for any remaining free spins.

17. A method for providing a game in a gaming machine, the gaming machine including an operation unit, an acceptor device, a display unit, and a control unit, the operation unit for accepting operation by a player, the acceptor device configured to accept media associated with a monetary value to establish a credit balance, the display unit for displaying a grid having a plurality of display elements in a predetermined arrangement forming a plurality of rows and columns, wherein each column of the grid forms a respective reel, each reel having an associated virtual reel strip, each virtual reel strip having symbols disposed thereon, the symbols on the virtual reel strips are from a set of symbols, the symbols in the set of symbols have a ranking from lower to highest, and the control unit connected to the operation unit, the acceptor device, and the display unit, the control unit configured to receive a signal from the acceptor device indicating a wager being made by the player on a game, adjust the credit balance by an amount of the wager, and rotate and randomly stop the plurality of virtual reel strips to display a plurality of symbols within the grid, the displayed symbols forming a first outcome, the method including the steps of:

removing all symbols of a particular type of symbol from the first outcome, the symbols of the particular type of symbol having corresponding symbol rankings that are less than a predetermined symbol ranking; and, filling the display element of any removed symbol from the first outcome by moving a following symbol from the respective virtual reel strip in a rotational direction of the respective reel into the respective display element, forming a second outcome;

wherein the particular type of symbol is determined as a function of the wager input by the player.

18. The method, as set forth in claim 17, wherein the secondary steps are repeated if a symbol of the particular type is within the second outcome.

19. The method, as set forth in claim 17, wherein the secondary steps are performed by the control unit in response to a triggering condition.

20. The method, as set forth in claim 19, wherein the triggering condition is within the first outcome.

21. The method, as set forth in claim 17, wherein the predetermined ranking is one of fixed and dynamically determined.

22. The method, as set forth in claim 17 wherein the gaming machine provides main game and a feature game, wherein the secondary steps are performed in the feature game.

23. The method, as set forth in claim 22, wherein the feature game includes a predetermined number of free spins.

24. The method, as set forth in claim 17, wherein the control unit awards a payout to the player as a function of the first outcome.

25. The method, as set forth in claim 17, wherein the control unit awards a payout to the player as a function of the second outcome.

26. The method, as set forth in claim 17, wherein the grid is displayed within a display region, wherein the at least a portion of a symbol from each virtual reel strip is visible above a top row when the reels are stopped.

27. A method for providing a game in a gaming machine, the gaming machine including an operation unit, an acceptor device, a display unit, and a control unit, the operation unit for accepting operation by a player, the acceptor device configured to accept media associated with a monetary value to establish a credit balance, the display unit for displaying a grid having a plurality of display elements in a predetermined arrangement forming a plurality of rows and columns, wherein each column of the grid forms a respective reel, each reel having an associated virtual reel strip, each virtual reel strip having symbols disposed thereon, the symbols on the virtual reel strips are from a set of symbols, the symbols in the set of symbols have a ranking from lower to highest, and the control unit connected to the operation unit, the acceptor device, and the display unit, the control unit configured to receive a signal from the acceptor device indicating a wager being made by the player on a game, adjust the credit balance by an amount of the wager, and rotate and randomly stop the plurality of virtual reel strips to display a plurality of symbols within the grid, the displayed symbols forming a first outcome, the method including the steps of:

removing all symbols of a particular type of symbol from the first outcome, the symbols of the particular type of symbol having corresponding symbol rankings that are less than a predetermined symbol ranking; and, filling the display element of any removed symbol from the first outcome by moving a following symbol from the respective virtual reel strip in a rotational direction of the respective reel into the respective display element, forming a second outcome;

wherein the secondary steps are repeated if a symbol of the particular type is within the second outcome, and wherein a number of types of the particular type of symbol may be increased based on the wager.

28. The method, as set forth in claim 27, wherein the particular type of symbol is determined as a function of the wager input by the player.

29. A method for providing a game in a gaming machine, the gaming machine including an operation unit, an acceptor device, a display unit, and a control unit, the operation unit for accepting operation by a player, the acceptor device configured to accept media associated with a monetary value to establish a credit balance, the display unit for displaying a grid having a plurality of display elements in a predetermined arrangement forming a plurality of rows and columns, wherein each column of the grid forms a respective reel, each reel having an associated virtual reel strip, each virtual reel strip having symbols disposed thereon, the symbols on the virtual reel strips are from a set of symbols, the symbols in the set of symbols have a ranking from lower to highest, and the control unit connected to the operation unit, the acceptor device, and the display unit, the control unit configured to receive a signal from the acceptor device indicating a wager being made by the player on a game, adjust the credit balance by an amount of the wager, and rotate and randomly stop the plurality of virtual reel strips to display a plurality of symbols within the grid, the displayed symbols forming a first outcome, the method including the steps of:

removing all symbols of a particular type of symbol from the first outcome, the symbols of the particular type of symbol having corresponding symbol rankings that are less than a predetermined symbol ranking; and, filling the display element of any removed symbol from the first outcome by moving a following symbol from the respective virtual reel strip in a rotational direction of the respective reel into the respective display element, forming a second outcome;

wherein the particular type of symbol may be modified to increase or decrease a number of symbols within the particular type of symbol.

30. The method, as set forth in claim 29, wherein the particular type of symbol may be modified by the control unit or by the player.

31. The method, as set forth in claim 29, wherein the modification of the particular type of symbol may expire after a predetermined number of spins.

32. A method for providing a game in a gaming machine, the gaming machine including an operation unit, an acceptor device, a display unit, and a control unit, the operation unit for accepting operation by a player, the acceptor device configured to accept media associated with a monetary value to establish a credit balance, the display unit for displaying a grid having a plurality of display elements in a predetermined arrangement forming a plurality of rows and columns, wherein each column of the grid forms a respective reel, each reel having an associated virtual reel strip, each virtual reel strip having symbols disposed thereon, the symbols on the virtual reel strips are from a set of symbols, the symbols in the set of symbols have a ranking from lower to highest, and the control unit connected to the operation unit, the acceptor device, and the display unit, the control unit configured to receive a signal from the acceptor device indicating a wager being made by the player on a game, adjust the credit balance by an amount of the wager, and rotate and randomly stop the plurality of virtual reel strips to display a plurality of symbols within the grid, the displayed symbols forming a first outcome, the method including the steps of:

removing all symbols of a particular type of symbol from the first outcome, the symbols of the particular type of symbol having corresponding symbol rankings that are less than a predetermined symbol ranking; and filling the display element of any removed symbol from the first outcome by moving a following symbol from the respective virtual reel strip in a rotational direction of the respective reel into the respective display element, forming a second outcome;

wherein the gaming machine provides main game and a feature game, wherein the secondary steps are performed in the feature game;

wherein the feature game includes a predetermined number of free spins;

wherein any removed symbol remains removed from the respective virtual reel for any remaining free spins.

33. A program for a gaming machine, the gaming machine including an operation unit, an acceptor device, a display unit, and a control unit, the operation unit for accepting operation by a player, the acceptor device configured to accept media associated with a monetary value to establish a credit balance, the display unit for displaying a grid having a plurality of display elements in a predetermined arrangement forming a plurality of rows and columns, wherein each column of the grid forms a respective reel, each reel having an associated virtual reel strip, each virtual reel strip having symbols disposed thereon, the symbols on the virtual reel strips are from a set of symbols, the symbols in the set of symbols have a ranking from lower to highest, and the control unit connected to the operation unit, the acceptor device, and the display unit, the control unit is configured to receive a signal from the acceptor device indicating a wager being made by the player on a game, adjust the credit balance by an amount of the wager, and rotate and randomly stop the plurality of virtual reel strips to display a plurality of symbols within the grid, the displayed symbols forming a first outcome, the control unit being further configured to perform a set of secondary steps, the gaming machine performing the steps including:

removing all symbols of a particular type of symbol from the first outcome, the symbols of the particular type of symbol having corresponding symbol rankings that are less than a predetermined symbol ranking; and, filling the display element of any removed symbol from the first outcome by moving a following symbol from the respective virtual reel strip in a rotational direction of the respective reel into the respective display element, forming a second outcome;

wherein the particular type of symbol is determined as a function of the wager input by the player.

* * * * *